(12) United States Patent
Batraev et al.

(10) Patent No.: US 12,744,946 B1
(45) Date of Patent: Sep. 22, 2026

(54) MACHINE-LEARNING BASED METHOD FOR ASSESSING HYBRID IN-PERSON AND REMOTE AUDIENCE MEMBER ENGAGEMENT

(71) Applicants: Constructor Technology AG, Schaffhausen (CH); Constructor Education and Research Genossenschaft, Schaffhausen (CH)

(72) Inventors: Victor Batraev, Sofia (BG); Nikolay Dobrovolskiy, Alanya (TR); Laurent Dedenis, Geneva (CH); Stanislav Protasov, Singapore (SG); Serg Bell, Singapore (SG)

(73) Assignee: Constructor Technology AG, Schaffhausen (CH)

( * ) Notice: Subject to any disclaimer, the term of this patent is extended or adjusted under 35 U.S.C. 154(b) by 0 days.

(21) Appl. No.: 19/245,572

(22) Filed: Jun. 23, 2025

(51) Int. Cl.
*H04N 21/2187* (2011.01)
*H04N 21/442* (2011.01)
*H04N 21/475* (2011.01)

(52) U.S. Cl.
CPC .................. *H04N 21/2187* (2013.01); *H04N 21/44218* (2013.01); *H04N 21/4758* (2013.01)

(58) Field of Classification Search
None
See application file for complete search history.

(56) References Cited

U.S. PATENT DOCUMENTS 12,028,180 B1 * 7/2024 Varma ................ H04L 12/1827
12,155,895 B1 * 11/2024 Hinkle .............. H04N 21/4788
12,548,330 B1 * 2/2026 He ......................... G06V 20/41
2017/0295404 A1 * 10/2017 Meredith ............ H04N 21/252
2019/0349212 A1 * 11/2019 Heins ................... H04L 67/306
2021/0373676 A1 * 12/2021 Jorasch ................ G06F 3/0383
2022/0086393 A1 * 3/2022 Peters .................... H04N 7/147

(Continued)

FOREIGN PATENT DOCUMENTS

CN 112488889 A * 3/2021 .......... G06V 40/168
CN 113298680 A * 8/2021 .......... G06Q 50/205

(Continued)

*Primary Examiner* — Ricky Chin

(74) *Attorney, Agent, or Firm* — ArentFox Schiff LLP; Michael Fainberg

(57) ABSTRACT

Disclosed herein are systems and methods for ML-based assessment of a live presentation by a presenter and engagement of in-person and remote audience members. The method includes: obtaining a live presentation video stream, a live presenter audio stream, and presentation material; evaluating the live presentation using a prepared presentation evaluation MLM; obtaining, for each audience member, whether in-person or remote, participating in the live presentation as an in-person audience member or a remote audience member, a plurality of video streams capturing each respective audience member, a plurality of audio streams for each respective audience member, and a plurality of capture streams capturing an interaction of each audience member and a respective computing device; evaluating an engagement of at least one audience member using a prepared engagement evaluation MLM; and generating a comprehension score based on the presentation score and the individual engagement score for at least one audience member.

20 Claims, 8 Drawing Sheets

(56) References Cited

U.S. PATENT DOCUMENTS

| | | | | |
|---|---|---|---|---|
| 2023/0208665 A1* | 6/2023 | Saxena | ................. | G06F 40/279 709/204 |
| 2023/0306782 A1* | 9/2023 | Dalabehera | .......... | G06V 10/764 |
| 2023/0360431 A1* | 11/2023 | Kuo | ..................... | G06V 40/176 |
| 2024/0037478 A1* | 2/2024 | Jhuremalani | .... | G06Q 10/06393 |
| 2024/0169383 A1* | 5/2024 | Nadolny | ............ | G06Q 30/0217 |
| 2024/0221524 A1* | 7/2024 | Nisar | ...................... | G10L 15/26 |
| 2025/0220269 A1* | 7/2025 | Su | .................... | H04N 21/44008 |

FOREIGN PATENT DOCUMENTS

| | | | | |
|---|---|---|---|---|
| CN | 113422988 A * | 9/2021 | ......... | H04N 21/4788 |
| CN | 114363103 A * | 4/2022 | ......... | H04N 21/4788 |
| CN | 115130933 A * | 9/2022 | ........... | G06Q 50/205 |
| CN | 115713441 A * | 2/2023 | ......... | H04N 21/4788 |
| CN | 116307355 A * | 6/2023 | ....... | G06Q 10/06393 |
| CN | 119941053 A * | 5/2025 | ......... | H04N 21/4788 |
| CN | 120298119 A * | 7/2025 | ............. | G06N 5/022 |
| CN | 120875681 A * | 10/2025 | ........... | G06N 3/0985 |
| CN | 121810119 A * | 4/2026 | ......... | H04N 21/4788 |
| KR | 102875713 B1 * | 10/2025 | .............. | H04W 4/80 |
| WO | WO-2022046168 A1 * | 3/2022 | ............. | G10L 25/63 |

* cited by examiner

MACHINE-LEARNING BASED METHOD FOR ASSESSING HYBRID IN-PERSON AND REMOTE AUDIENCE MEMBER ENGAGEMENT

FIELD OF TECHNOLOGY

The present disclosure relates to the field of machine learning, and, more specifically, to systems and methods for machine learning based methods for assessing a presentation by a presenter and engagement of in-person and remote audience members of the presentation, including providing recommendations for both the presenter and audience members.

BACKGROUND

When presenters present to a large audience of disengaged audience members, several significant problems arise. In a teaching scenario, a lack of engagement reduces learning outcomes, as students are less likely to retain information or develop an understanding of the subject of the lecture. The absence of interaction diminishes opportunities for discussion and feedback, which contribute to a rich learning experience. For presenters, this disengagement can be demotivating, leading to a decline in the quality of presenting (or teaching) over time. Additionally, disengaged audience members prevent presenters from gauging comprehension effectively, making it harder to adjust teaching strategies to meet the audience member's needs. Ultimately, this creates an inefficient use of time and resources, as the goals of the presentation remain unfulfilled.

The causes of disengagement are multifaceted. Monotone delivery, a lack of interaction, and overly formal or dense presentation slides can make presentation material feel inaccessible or unimportant. External distractions, such as mobile devices or internet browsing, and the anonymity associated with a large audience member size further contribute to disengagement. Additionally, in a learning scenario, students who lack foundational knowledge or preparation may struggle to follow the lecture, leading to frustration and disinterest. Poor use of technology or visual aids can also make lectures feel outdated and less appealing. Addressing these challenges requires a thoughtful approach, incorporating interactive methods, relatable content, and technology to foster an engaging environment.

SUMMARY

The present disclosure describes a system and method for a machine learning based method for assessing a presentation and generating real-time feedback and post-presentation recommendations for the presenter and assess engagement of in-person and remote audience members of the presentation and generating a real-time engagement score and post-presentation recommendations for the in-person and remote audience members. Some of the technical improvements of the present disclosure is the ability to train and utilize machine learning models (MLMs) to efficiently assess the quality and effectiveness of engagement of in-person and remote audience members participating in a presentation (e.g., lecture) with real-time scores and recommendations using machine-based methods without the need for a manual assessment.

In addition, the present disclosure also describes the ability to train and utilize a MLM to assess the engagement of the audience members of the presentation with real-time scores and recommendations using machine-based methods and making the system suitable for large-scale assessments. In addition, the present disclosure describes using the prepared MLMs to generate immediate, personalized scores and provide recommendations for both the presenter and audience members. This allows the system to quickly identify areas for improvements and help the presenter and audience members adjust their presenting and listening style accordingly. By analyzing vast amounts of data in real-time, the MLM can analyze and evaluate different factors including dozens of indicators measuring engagement for audience members. This leads to more informed feedback on a level of comprehension of the presentation by the audience members.

Other technical benefits of the present disclosure include the ability to utilize the MLMS to process large volumes of data—such as vocal tones, facial expressions, body language, and audience member reactions—with a level of consistency and objectivity that human evaluators often cannot match. This ensures that feedback is more accurate and less influenced by subjective biases. Moreover, MLMs can analyze live data streams, delivering real-time insights that help presenters adjust their delivery on the spot. By understanding individual behavior patterns and learning preferences, these methods can also provide highly personalized recommendations, suggesting interactive elements or additional resources tailored to specific audience members. Once trained, MLMs can efficiently evaluate numerous presentations and large groups, making it possible to provide detailed, actionable feedback at scale. Over time, these MLMs become increasingly accurate, adapting to changes in presentation styles and audience dynamics. By integrating information from multiple channels-audio, video, and text transcripts-machine learning offers a comprehensive understanding of a presentation's impact, revealing complex patterns that simpler methods might overlook. For presenters, this means insights into which topics and delivery styles resonate most; for audience members, it results in customized learning recommendations that enhance engagement and understanding. Ultimately, the technical advantages of machine learning-based approaches lead to more effective presentations, improved audience engagement, and better learning outcomes.

In one exemplary aspect, a method for machine learning (ML)-based assessment of a live presentation by a presenter and engagement of in-person and remote audience members is disclosed. The method includes: obtaining a live presentation video stream of a live presentation, a live presenter audio stream of the live presentation, and presentation material, wherein the live presentation is associated with the presentation material; evaluating the live presentation using a prepared presentation evaluation MLM configured to generate a presentation score based on the live presentation video stream, the live presenter audio stream, and the presentation material; obtaining, for each audience member participating in the live presentation as an in-person audience member or a remote audience member, a plurality of video streams capturing each respective audience member, a plurality of audio streams for each respective audience member, and a plurality of capture streams capturing an interaction of each audience member and a respective computing device; evaluating an engagement of at least one audience member using a prepared engagement evaluation MLM configured to generate an individual engagement score for the at least one audience member based on the plurality of video streams, the plurality of audio streams, and the plurality of capture streams; and generating, by a scoring engine, a comprehension score based at least in part on the presentation score and the individual engagement score for the at least one audience member.

In some aspects, the techniques described herein relate to a method, wherein the prepared presentation evaluation MLM is further configured to generate a live presentation score based on individual engagement scores for in-person audience members and remote presentation score based on individual engagement scores for remote audience members.

In some aspects, the techniques described herein relate to a method, wherein the prepared engagement evaluation MLM is configured to evaluate the individual engagement score for an audience member participating as an in-person audience member differently than an audience member participating as a remote audience member by assigning a first set of weights to the plurality of video streams, the plurality of audio streams, and the plurality of capture streams capturing each respective audience member participating as an in-person audience member and a second set of weights to the plurality of video streams, the plurality of audio streams, and the plurality of capture streams capturing each respective audience member participating as a remote audience member.

In some aspects, the techniques described herein relate to a method further including: based on the comprehension score, an output of the prepared presentation evaluation MLM, and an output of the prepared engagement evaluation MLM, generating, by a recommendation engine, a presenter recommendation to engage in-person audience members, a presenter recommendation to engage remote audience members, an in-person audience member recommendation, or a remote audience member recommendation; and displaying, on a display, at least one of the presenter recommendation to engage in-person audience members, the presenter recommendation to engage remote audience members, the in-person audience member recommendation, the remote audience member recommendation, the comprehension score, the presentation score, or the individual engagement score for the at least one audience member.

In some aspects, the techniques described herein relate to a method, wherein the presenter recommendation to engage in-person audience members comprises at least one of: ask a question, introduce a poll or quiz, call on an audience member, identifying an audience member via audio stream, acknowledge contribution of an audience member, slow down, speed up, repeat material, summarize material, present a visual aid, or introduce a break, wherein the presenter recommendation to engage remote audience members comprises at least one of: ask a question, introduce a poll or quiz, call on an audience member, acknowledge contribution of remote audience member, slow down, speed up, repeat material, summarize material, present a visual aid, check framing, monitor audio, avoid filter words, rephrase for clarity, emphasize key points, stay on time, or introduce an audio stream capturing audio from the in-person audience members, wherein the in-person audience member recommendation comprises at least one of: take notes, ask questions, respond to prompts, use non-verbal feedback, participate in chat, adjust computing environment, or change physical posture, and wherein the remote audience member recommendation comprises at least one of: take notes, ask questions, respond to prompts, use non-verbal feedback, participate in chat, adjust computing environment, change physical posture, pause lecture, or re-watch portion of lecture.

In some aspects, the techniques described herein relate to a method further including: identifying a subject matter for the presentation and recognizing topics for the presentation using a topic MLM configured to determine main topics of the presentation based on the presentation material; evaluating the presentation of each topic of the presentation using the prepared presentation evaluation MLM configured to generate a respective presentation score for each topic based on the subject matter, recognized topic, presentation video stream, the presenter audio stream, and the presentation material; and evaluating the engagement of at least one audience member for each topic of the presentation using the prepared engagement evaluation MLM configured to generate a respective engagement score of the at least one audience member for each topic based on the subject matter, the recognized topic, the plurality of video streams, the plurality of audio streams, and the plurality of capture streams.

In some aspects, the techniques described herein relate to a method further including evaluating a group engagement of audience members for the presentation by generating, using the score engine, a group engagement score based on a plurality of engagement scores for each audience member participating as an in-person audience member or a remote audience member.

In some aspects, the techniques described herein relate to a method further including evaluating a group engagement of audience members for each topic of the presentation using the prepared engagement evaluation MLM configured to generate a respective group engagement score of audience members for each topic based on the subject matter, the recognized topic, the plurality of video streams, the plurality of audio streams, and the plurality of capture streams.

In some aspects, the techniques described herein relate to a method further including: obtaining an audio stream of the in-person audience members, a pre-recorded presentation video stream of a pre-recorded presentation, a pre-recorded presenter audio stream of the pre-recorded presentation, wherein the live presentation is associated with the pre-recorded presentation; and evaluating the pre-recorded presentation using the prepared evaluation MLM to further generate the presentation score based on the audio stream of the in-person audience members, the live presentation video stream, the live presenter audio stream, the pre-recorded presentation video stream, the pre-recorded presenter audio stream, and the presentation material.

In some aspects, the techniques described herein relate to a method further including: preparing the presentation evaluation MLM by: (1) providing, to the presentation evaluation MLM, a presentation training dataset comprising at least one of: (a) presenter video streams of individuals giving a presentation labeled and annotated with quality scores for clarity, engagement, accuracy, or content delivery to evaluate at least one of body language, gestures, facial expressions, or visual aids of the presenter, (b) corresponding audio streams labeled and annotated for features of at least one of voice quality, pauses, tone, or fluency to analyze speech delivery, clarity, tone, or impact of the presenter, (c) presentation material aligned with the labeled presenter video streams labeled and annotated to assess at least one of content quality, relevance, or alignment between the presentation and the presentation materials, and (d) ground truth labels for the presenter video streams, the corresponding audio streams, or the presentation material to serve as a target output for the presentation evaluation MLM model; and (2) preparing the presentation evaluation MLM using the presentation training dataset.

In some aspects, the techniques described herein relate to a method further including: preparing the engagement evaluation MLM by: (1) providing, to the engagement evaluation MLM, an engagement training dataset comprising at least one of: (a) individual video streams of audience members of a presentation labeled and annotated with facial expressions, gaze direction, body posture, or head movement to capture visual engagement cues, (b) corresponding audio streams labeled and annotated with speech activity, tone analysis, interruptions and pauses, or emotion detection to analyze participation through voice contribution and tone of speech, (c) capture streams of the audience members comprising at least one of keyboard input, mouse movements, or screen interactions, wherein the capture streams are labeled and annotated with active engagement, passive behavior, or multitasking to measure interaction of the audience members with a respective computing device, (d) an event list comprises at least one of interaction events, participation events, attention-related events, engagement-related events, time-based events, or behavioral and biometric events annotated with engagement levels, activity frequency, or contribution quality to capture session-specific events that indicate audience member engagement, and (e) ground truth labels for the individual video streams, the corresponding audio streams, the capture streams, or the event list to serve as a target output for the engagement evaluation MLM; and (2) preparing the engagement evaluation MLM using the provided engagement training database.

In some aspects, the techniques described herein relate to a method further including: preparing the topic MLM by: (1) providing, to the topic MLM, a topic training dataset comprising at least one of: (a) presentation materials labeled and annotated with subject matter, key topics, or keywords and phrases to extract and analyze a textual and visual content of the presentation to infer the subject matter and individual topics, (b) topic labeled datasets comprising at least domain-specific data labeled and annotated with subject matter tags and topics to train the topic MLM to recognize subject matter and topics, (c) audio and video presentation data comprising at least presentation recordings and corresponding audio streams labeled and annotated with subject matter and topics to identify spoken words, tone, and context for recognizing topics, and (d) ground truth labels for the presentation materials, topic labeled datasets, or audio and video presentation data to serve as a target output for the topic MLM; and (2) preparing the topic MLM using the provided topic training dataset.

In some aspects, the techniques described herein relate to a method further including generating, by a recommendation engine, and displaying, on a display, a post-presentation presenter recommendation or a post-presentation audience member recommendation based on outputs of the prepared presentation MLM and the prepared engagement evaluation MLM.

According to one aspect of the disclosure, a system is for machine learning (ML)-based assessment of a live presentation by a presenter and engagement of in-person and remote audience members, the system including: at least one memory, and at least one hardware processor coupled with the at least one memory and configured, individually or in combination, to: obtain a live presentation video stream of a live presentation, a live presenter audio stream of the live presentation, and presentation material, wherein the live presentation is associated with the presentation material; evaluate the live presentation using a prepared presentation evaluation MLM configured to generate a presentation score based on the live presentation video stream, the live presenter audio stream, and the presentation material; obtain, for each audience member participating in the live presentation as an in-person audience member or a remote audience member, a plurality of video streams capturing each respective audience member, a plurality of audio streams for each respective audience member, and a plurality of capture streams capturing an interaction of each audience member and a respective computing device; evaluate an engagement of at least one audience member using a prepared engagement evaluation MLM configured to generate an individual engagement score for the at least one audience member based on the plurality of video streams, the plurality of audio streams, and the plurality of capture streams; and generating, by a scoring engine, a comprehension score based at least in part on the presentation score and the individual engagement score for the at least one audience member.

In one exemplary aspect, a non-transitory computer-readable medium is provided storing a set of instructions thereon for machine learning (ML)-based assessment of a live presentation by a presenter and engagement of in-person and remote audience members, the system, including instructions for: obtaining a live presentation video stream of a live presentation, a live presenter audio stream of the live presentation, and presentation material, wherein the live presentation is associated with the presentation material; evaluating the live presentation using a prepared presentation evaluation MLM configured to generate a presentation score based on the live presentation video stream, the live presenter audio stream, and the presentation material; obtaining, for each audience member participating in the live presentation as an in-person audience member or a remote audience member, a plurality of video streams capturing each respective audience member, a plurality of audio streams for each respective audience member, and a plurality of capture streams capturing an interaction of each audience member and a respective computing device; evaluating an engagement of at least one audience member using a prepared engagement evaluation MLM configured to generate an individual engagement score for the at least one audience member based on the plurality of video streams, the plurality of audio streams, and the plurality of capture streams; and generating, by a scoring engine, a comprehension score based at least in part on the presentation score and the individual engagement score for the at least one audience member.

The above simplified summary of example aspects serves to provide a basic understanding of the present disclosure. This summary is not an extensive overview of all contemplated aspects and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

Like reference numbers and designations in the various drawings indicate like elements.

DETAILED DESCRIPTION

Figure 1:
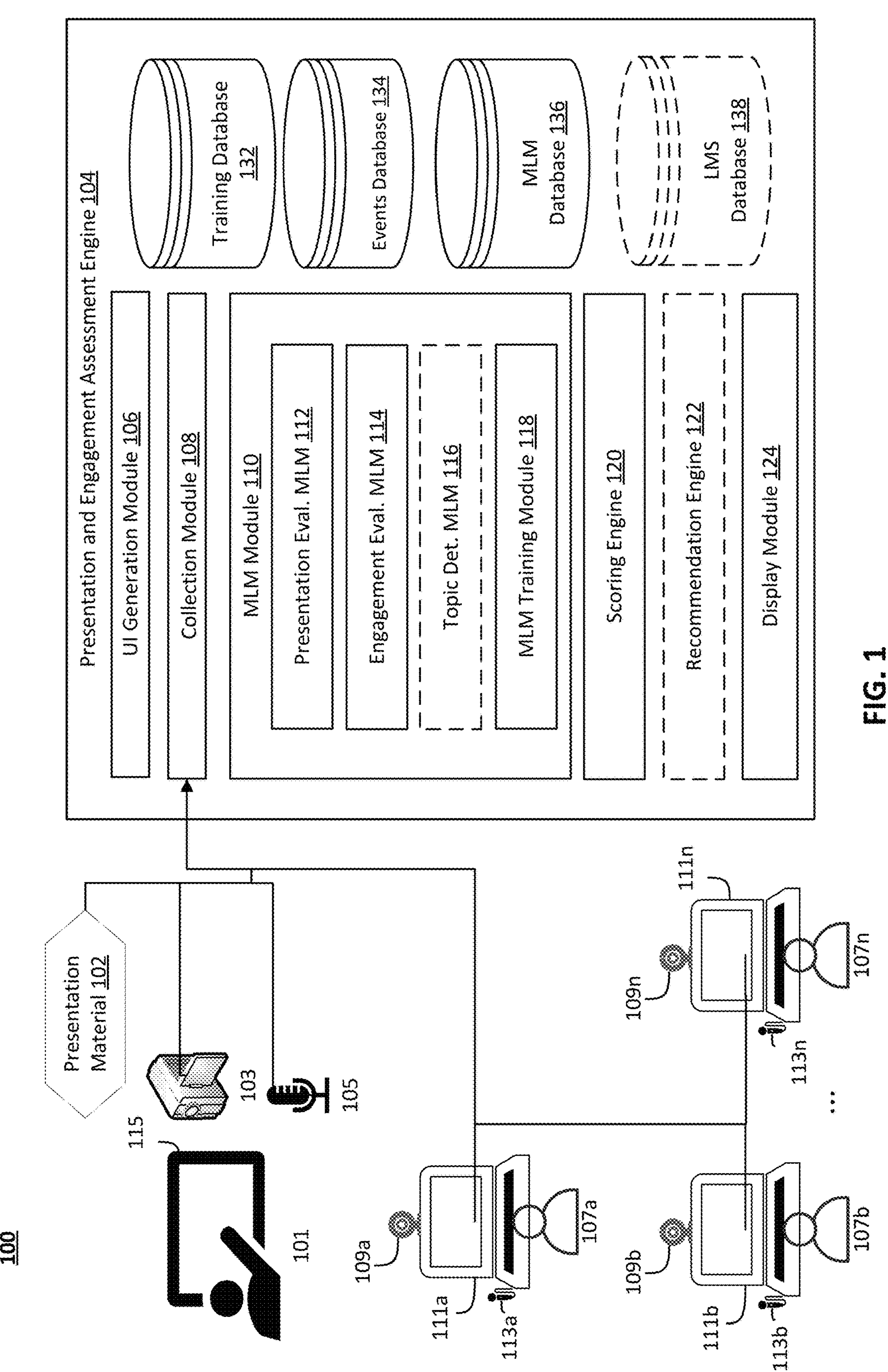
FIG. 1 is a block diagram illustrating a system for assessing a presentation for a presenter and engagement level of audience members and providing recommendations for the presenter and the audience members according to aspects of the present disclosure.

Exemplary aspects are described herein in the context of a system, method, and computer program product for a machine learning (ML) based assessment of a presentation by presenter engagement of audience members and providing real-time scores and recommendations to both the presenter and audience members. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In recent years, the application of ML-based methods to assess presentations and in-person and remote audience member engagement has gained significant attention. These approaches leverage advanced algorithms to analyze a wide range of data, including vocal tone, facial expressions, body language, and audience feedback. By analyzing data like speech patterns, body language, facial expressions, and audience member feedback, these methods remove human bias and deliver consistent, data-driven assessments. The ML-based methods also allow real-time feedback, helping presenters adapt on the spot to maintain interest and address disengagement. Furthermore, ML can personalize real-time and/or post-presentation recommendations, offering tailored suggestions for both presenters and audience members based on observed behaviors and engagement levels. This leads to more effective presentations, better audience experiences, and improved learning outcomes.

Using ML-based methods to assess presentations and audience member engagement offers several important benefits. First, these methods bring a level of objectivity and consistency that is difficult to achieve through manual evaluations. They analyze large volumes of data-such as voice tone, facial expressions, and audience reactions-providing unbiased, evidence-driven insights. This enhances the reliability of the feedback and helps presenters refine their techniques more effectively.

Additionally, ML enables real-time assessment. The present disclosure can identify when audience engagement wanes and alert the presenter immediately, allowing for on-the-fly adjustments to maintain interest and improve communication. This timely feedback can lead to more dynamic and responsive presentations, fostering a stronger connection with the audience.

Another significant advantage is personalization. ML systems can identify individual preferences and engagement patterns, allowing for tailored recommendations. For example, a system might suggest more visual aids for visual learners or more interactive elements if it detects higher engagement during Q&A segments. This customization benefits both presenters and audience members, helping to ensure that everyone involved gets the most out of the presentation experience.

Finally, the scalability and efficiency of ML methods allow them to be used repeatedly and on a larger scale without additional manual effort. Over time, as more data is collected, the system improves in accuracy and nuance, continuously providing actionable insights. This leads to better-prepared presenters, more engaged audiences, and ultimately more effective communication and learning outcomes.

Accordingly, the present disclosure assesses a quality and effectiveness of a presentation by a presenter and the focus and engagement level of in-person and remote audience members. One aspect involves analyzing the presenter and presentation material using a prepared presentation MLM configured to generate a presentation score for the presenter. A second aspect involves analyzing the audience members of the presentation using a prepared engagement MLM configured to generate individual engagement scores for each audience member. A third aspect involves generating a comprehension score for the audience members based on the presentation score by the presenter and the engagement scores of the audience members. A fourth aspect involves determining a topic list for the presentation and generating presentation scores and/or engagement scores for each topic from the topic list during the presentation. A fifth aspect involves generating real-time and/or post-presentation recommendations for both the presenter and the audience members. Turning now to the figures, example aspects are depicted with reference to one or more components described herein, where components in dashed lines may be optional.

FIG. 1 is a block diagram illustrating a system 100 configured for assessing a presentation by a presenter and engagement of audience members of the presentation, including providing recommendations for both the presenter and audience members. In one aspect, the components of system 100 may be implemented on computer systems, such as that shown in FIG. 7.

The system 100 may be used to assess a presentation by a presenter 101 and/or engagement by the audience members 107*a*, 107*b*, 107*n*. Audience members 107*a*, 107*b*, and 107*n* may represent individual participants attending the presentation, and can include both in-person audience members and remote audience members. An in-person (e.g., onsite) audience member refers to a participant physically present at the location where the live presentation is being conducted. In contrast, a remote audience member refers to a participant accessing the presentation through a networked communication platform, such as a video conferencing or streaming service, from a location other than the physical presentation venue. Each audience member type may interact with the presentation content through different modalities and devices.

The presentation and engagement assessment engine 104 is configured to analyze presentation material 102 and a quality and effectiveness of the presentation by the presenter 101 and each in-person and/or remote audience member 107*a*, 107*b*, 107*c* based on a video stream and audio stream of the presenter. In addition, the presentation and engagement assessment engine 104 is also configured to analyze a focus and engagement of audience members based on capturing a video stream, audio stream, and screen capture of each audience member. Furthermore, the presentation and engagement assessment engine 104 is configured to generate scores indicating the quality and effectiveness of the presenter's presentation style and presentation material, the engagement score and focus level of the audience members, and an overall comprehension level of the material from the presentation by the audience members. This provides a way to implement real-time feedback and personalized recommendations for the presenter and the audience members. In this way, the presentation and engagement assessment engine 104 can quickly analyze data from dozens of cameras, microphones, and screen captures such as vocal tones, facial expressions, body language, and audience member reactions and generate real-time feedback and personalized recommendations for the presenter and audience members, offering a holistic and immediate insights into their presentation and presentation comprehension. Additional input for assessing a presentation can include mobile devices (such as cell phones and tablets), wearable devices, and other technologies that provide data reflecting the behavior of the presenter. This may also involve projectors, whiteboards, and other devices used in delivering a lecture, particularly when evaluating real-room activity. For assessing audience engagement, inputs can include mobile devices, wearable devices, and other technologies that capture data on audience behavior.

The system 100 includes at least presentation material 102, a presenter 101, presenter 101 inputs including at least a camera 103 capturing the presenter 101, a microphone 105, and a computing device 115, at least one audience member 107*a* of the presentation including at least a corresponding camera 109*a*, microphone 113*a*, and a computing device 111*a* for each audience member 107*a*, and a presentation and engagement assessment engine 104. The presentation and engagement assessment engine 104 may be configured to analyze and generate scores and/or recommendations for both the presenter 101 and the audience members 107*a*, 107*b*, 107*n* using their corresponding cameras 103, 109*a*, 109*b*, 109*n*, microphones 105, 113*a*, 113*b*, 113*n*, and computing devices 115, 111*a*, 111*b*, 111*n*. The computing device 115 may execute a plurality of modules in the presentation and engagement assessment engine 104 that together make up the collection, analysis, scoring, and recommendation system. In some aspects, the presentation and engagement assessment engine 104 may correspond to the computing device 115 or cloud network (not shown) that is configured to execute a plurality of modules that together make up the presentation and engagement assessment engine 104 for evaluating the presentation for the presenter 101 and engagement of the audience members 107*a*, 107*b*, 107*n*. It should be noted that only three audience members 107*a*, 107*b*, 107*n* are depicted in FIG. 1, the present disclosure is not limited to only three audience members and may be applied to any number of audience members.

In some aspects, the presentation and engagement assessment engine 104 may include a user interface (UI) generation module 106, a collection module 108, a MLM module 110 including at least a presentation evaluation MLM 112, an engagement evaluation MLM 114, an optional topic determination MLM 116, and a MLM training module 118, a scoring engine 120, an optional recommendation engine 122, a display module 124, a training database 132, an events database 134, a MLM database 136, and an optional LMS database 138.

The computing device 115 may execute a UI generation module 106 to implement a UI for display on the computing devices 115, 111*a*, 111*b*, 111*n* that is configured to receive input from the respective computing devices and display real-time scoring and recommendations. In particular, the computing device 115 for the presenter 101 may display real-time scoring of the presentation score along with real-time scoring of the engagement score for the audience members, and comprehension score for the audience members. Accordingly, the computing devices 111*a*, 111*b*, 111*n* for each audience member will only display real-time scoring of their own respective engagement score and recommendations for increasing engagement.

In some aspects, the UI generation module 106 generates a single UI for a presenter 101 and a single layout for the audience members 107*a*, 107*b*, 107*n* and layout and components of the UI elements (e.g., menus, buttons, forms, grids, etc.) based on predefined rules, data models, or templates. In some aspects, the UI generation module 106 may also be configured to automatically adjust the UI elements based on the content or data that it needs to display such as adapting a form to input fields or displaying a list of items. In some aspects, the UI generation module 106 may also be configured to adapt the UI to different screen sizes and resolutions by making sure that the UI works well across various devices.

The computing device 115 may execute a collection module 108 that collects and obtains lecture material 102, data streams from the cameras 103, 109*a*, 109*b*, 109*n*, microphones 105, 113*a*, 113*b*, 113*n*, and screen captures of the computing devices 111*a*, 111*b*, 111*n* to evaluate the presentation and engagement for generating both real-time presentation and engagement feedback and recommendations. In some aspects, portions of the lecture material 102 may be stored on a training database 132. In some aspects, data from the cameras 103, 109*a*, 109*b*, 109*n*, microphones 105, 113*a*, 113*b*, 113*n*, and screen captures of the computing devices 111*a*, 111*b*, 111*n* may be stored in the events database 134. In some aspects, the prepared presentation evaluation MLM, the engagement evaluation MLM, and the topic determination MLM may be stored on a MLM database 136. In some aspects, the training database 132, the events database 134, the MLM database 136, and the optional LMS database 138 may be stored on a local device or a cloud network.

In some aspects, data for each audience member 107*a*, 107*b*, 107*n* may be obtained from Learning Management System (LMS) data by the collection module 108. The LMS is a software platform that helps educators manage, deliver, and track educational content and training programs. It acts as a central hub for creating, distributing, and organizing learning materials, assignments, assessments, and communications for both in-person and online learning environments. With an LMS, instructors can create courses, upload content (like readings, videos, or quizzes), and manage assignments, grades, and attendance all in one place. Learners can access their course materials, submit assignments, take quizzes, engage in discussions, and receive feedback directly within the system. LMS platforms are widely used by educational institutions, corporations, and organizations for both formal education and professional training, as they provide a scalable way to deliver personalized learning experiences and track learner progress effectively.

The LMS data may be categorized broadly based on the various functions and interactions that take place within the LMS. The LMS data may include course data that includes information about courses such as course titles, descriptions, syllabus details, instructional content (documents, videos, quizzes), learning modules, and activities. It also includes course duration, structure, and related resources used by learners and instructors. LMS data may include learning progress data that captures learners' progress through their courses. It includes information about course completion rates, progress tracking, assignments submitted, quiz scores, badges earned, and time spent on different sections or lessons. Learning progress data helps instructors assess how well learners are following along and identify areas where additional support might be needed. LMS data may include assessment data comprises all the information related to evaluations, such as quiz and test scores, feedback on assignments, participation in assessments, and grades. It also includes performance trends over time and proficiency scores in specific topics. LMS data may also include engagement data measures how actively learners participate within the LMS environment. This can include metrics such as login frequency, participation in discussion forums, completion of activities, and engagement with course content (e.g., clicks on videos, frequency of accessing reading materials). LMS data may also include behavioral data records learners' interactions with the LMS, such as login timestamps, clicks, navigation behavior, time spent on different resources, and sequences of actions taken. This data helps to understand usage patterns and identify potential roadblocks or opportunities for improving the learning experience.

LMS data may also include feedback data refers to any comments, surveys, or ratings submitted by learners regarding courses or the overall learning experience. It includes instructor feedback provided to learners on assignments or exams as well. LMS data may also include completion data that involves data on course outcomes, such as completed modules, final grades, earned certifications, and dropout rates. Completion data provides insights into learner success and course effectiveness. LMS data may also include attendance data that indicates who attended, how often learners join live lectures or webinars, and any participation rates in live components of the learning. LMS data may also include learning paths and recommendations that reflect personalized paths assigned to different learners, which might include prerequisites completed, courses recommended, suggested resources, and individualized learning plans.

In some aspects, presentation material 102 may be obtained by the collection module 108. The presentation material 102 may include at least presentation slides, lecture notes, speaking notes, readings and references, multimedia content, case studies and examples, exercise and practice questions, diagrams and chats, discussion prompts, or supplementary resources. The presentation material 102 serves as a guide to the core concepts and topics covered in the presentation. Presentation material 102 provides a structured outline that covers both theoretical frameworks with practical examples to enhance understanding. In some aspects, the lecture material may encourage active participation through discussion prompts and exercises to lay a solid foundation for further exploration and mastery of the subject.

The computing device 115 may execute a MLM module 110 including at least a presentation evaluation MLM 112, an engagement evaluation MLM 114, an optional topic determination MLM 116, and a MLM training module 118.

In some aspects, the MLMs in the MLM modules 110 may correspond to a large language model (LLM). It should be noted that LLMs are described in this present disclosure for illustrative purposes only and that any suitable MLM may be utilized to perform the particular specific tasks of the presentation evaluation MLM 112, the engagement evaluation MLM 114, and the optional topic determination MLM 116.

A LLM is an advanced artificial intelligence system designed to understand and generate human-like text. These models are trained on vast amounts of data, enabling them to comprehend context, recognize patterns, and produce coherent and contextually relevant responses. LLMs are utilized in various applications, including chatbots, content creation, and language translation. Their ability to process and generate natural language makes them powerful tools for enhancing communication and automating tasks that require language understanding. However, the LLM modules must first go through preparing (e.g., training, retraining, distillation, fine-tuning, etc.) to teach each LLM model to perform their respective specific tasks. As a nonlimiting example, the LLM models may incorporate one of the MLMs listed below.

A transformer is a deep learning architecture used in large language models (LLMs). The transformer has an encoder/decoder structure with numerous stacked multi-head attention layers and feed forward network layers. This architecture allows the model to process and generate text effectively, capturing long-range dependencies and contextual information. Transformers are well-suited for tasks like natural language processing, and image classification and generation. Common examples of transformer models are generative pre-trained transformer (GPT) and Bidirectional Encoder Representations from Transformers (BERT).

A classification model is a type of MLM that is designed to predict the category or class to which a given data point belongs to. The classification model works by analyzing input features and assigning them to one of several predefined labels. These models are trained on labeled data, where the correct category is known, and they learn patterns that allow them to make predictions on new, unseen data. Examples of classification models include at least a regression model used for binary classification, a decision tree used to predict class by splitting data based on feature values, support vector machine (SVM) configured to perform classification by finding the best boundary between classes, and neural networks.

In some examples, a prepared presentation evaluation MLM **227*a*** may comprise one or more neural networks, which are a class of MLMs inspired by the structure and functioning of the human brain. They consist of interconnected nodes, called neurons or artificial neurons, organized into layers. Neural networks are capable of learning complex patterns and representations from data. The neural network executed by the presentation evaluation MLM may be one of the following: transformer neural network, convolution neural network (CNN), recurrent neural network (RNN), long short-term memory (LSTM) network, gated recurrent unit (GRU) network, autoencoder, generative adversarial network (GAN).

An autoencoder is a type of neural network used for unsupervised learning and dimensionality reduction and consists of an encoder that compresses input data into a lower-dimensional representation (encoding) and a decoder that reconstructs the original input from the encoding.

For analysis tasks such as evaluating the presentation or generating a score and/or feedback, an untrained presentation evaluation MLM 112 will first analyze data from a training set to "learn" what is considered an effective presentation material and/or style and generate feedback indicating a quality and effectiveness of the particular presentation. As an example, the training dataset may include at least: (a) presenter video streams of presenters presenting a presentation labeled and annotated with quality scores for clarity, engagement, accuracy, or content delivery to evaluate at least one of body language, gestures, facial expressions, or visual aids of the presenter, (b) corresponding audio streams labeled and annotated for features of at least one of voice quality, pauses, tone, or fluency to analyze speech delivery, clarity, tone, or impact of the presenter, (c) presentation material aligned with the labeled presenter video streams labeled and annotated to assess at least one of content quality, relevance, or alignment between the presentation and the presentation materials, and (d) ground truth labels for the presenter video streams, the corresponding audio streams, or the presentation material to serve as a target output for the presentation evaluation MLM model.

During training of the presentation evaluation MLM 112, the results from the untrained MLM are then compared with known data set results using the corresponding labels identifying different types of presentation styles and their effectiveness. It should be noted that the input to the trained MLM in the presentation evaluation MLM 112 will be data from the training dataset.

For every input training sample from the training dataset, the trained MLM in the presentation evaluation MLM 112 will produce a prediction consisting of values representing a probability that a particular presentation style is ineffective or effective in the form of a score based on the video stream of the presenter from the camera 103, the presentation material 102, and the audio stream of the presenter 101. The output with the highest probability determines the predicted score. A class label for each answer may be used to compute a loss (e.g., loss function).

The trained MLM in the presentation evaluation MLM 112 then uses a loss function that quantifies the error between the predicted output and the ground truth for a given training sample. In other words, the loss function can be used to guide the learning process by updating the network weights in a way that improves the accuracy of future predictions. This process may continue until the difference between the prediction and the correct targets is minimal. In some examples, an appropriate loss function, such as Mean Squared Error (MSE) for regression tasks or a Cross-Entropy Loss for classification tasks.

Once the MLM is trained (e.g., inference), the trained presentation evaluation MLM from the presentation evaluation MLM 112 may evaluate the presentation by comparing them with different presentations ranging from ineffective presentation to effective presentations and generate real-time feedback that indicates a level of effectiveness of the presentation with a score.

During inference, the trained presentation evaluation MLM from the presentation evaluation MLM 112 does not re-evaluate or adjust the layers of the neural network based on the results. Instead, the inference applies knowledge from the trained neural network and uses it to infer a result. Accordingly, when a new unknown dataset (e.g., new presentation) is input through the prepared MLM in the trained presentation evaluation MLM from the presentation evaluation MLM 112, the trained MLM outputs a score evaluating the presentation based on predictive accuracy of the MLM.

Similarly, during preparation (e.g., training) of the engagement evaluation MLM in the engagement evaluation MLM 114, the engagement training dataset will include training including at least one of: (a) individual video streams of audience members of a presentation labeled and annotated with facial expressions, gaze direction, body posture, or head movement to capture visual engagement cues, (b) corresponding audio streams labeled and annotated with speech activity, tone analysis, interruptions and pauses, or emotion detection to analyze participation through voice contribution and tone of speech, (c) capture streams of the audience members comprising at least one of keyboard input, mouse movements, or screen interactions, the capture streams may be labeled and annotated with active engagement, passive behavior, or multitasking to measure interaction of the audience members with a respective computing device, (d) an event list comprises at least one of interaction events, participation events, attention-related events, engagement-related events, time-based events, or behavioral and biometric events annotated with engagement levels, activity frequency, or contribution quality to capture session-specific events that indicate audience member engagement, and (e) ground truth labels for the individual video streams, the corresponding audio streams, the capture streams, or the event list to serve as a target output for the engagement MLM. In some aspects, analyzing the engagement of the audience members using LMS data from the optional LMS database 138. It should be noted that the input to of the engagement evaluation MLM in the engagement evaluation MLM 114 will be data from the training dataset.

In some aspects, the individual video streams, corresponding audio streams, and/or capture streams may be obtained and stored on an events database 134 such that the data from each stream is indicative of engagement. As a non-limiting example, the events that may be detected or identified may include at least one of: facial expressions (e.g., smiling, nodding, or raising eyebrows as a sign of agreement, interest, or curiosity for engagement), eye contact (e.g., maintaining eye contact with the presenter or the visual aids or avoiding signs of distraction, such as frequently looking at phones, watches, or around the room), posture (e.g., leaning forward as a sign of interest and attentiveness or sitting upright, as opposed to slouching or reclining, which may indicate disengagement), gestures and movements (e.g., nodding in agreement or making thoughtful gestures or limited fidgeting, restlessness, or other signs of distraction), participation (e.g., actively asking questions, responding to prompts, or interacting with the presenter or engaging in discussions or showing enthusiasm during group activities), verbal cues (e.g., providing thoughtful and relevant answers to questions posed by the presenter, making comments or contributions that reflect understanding and attention, or expressive and engaged tones when speaking, rather than monotone or hesitant replies), behavioral interaction with tools or aids (e.g., engagement with provided tools, such as polls, quizzes, or note-taking applications), or social interaction (e.g., collaborative engagement with other audience members during group activities or discussions).

For every input training sample from the training dataset, the trained MLM from the engagement evaluation MLM 114 will produce a prediction consisting of values representing a probability corresponding to an evaluation of a level of engagement (or focus) of the presentation by each in person and/or remote audience member based on the video streams from the cameras 109*a*, 109*b*, 109*n*, the audio stream from the microphones 113*a*, 113*b*, and 113*n*, and the capture screens of the computing devices 111*a*, 111*b*, 111*n*. The output with the highest probability determines the generated score indicating a level of engagement and focus of each audience member.

Similar to the trained MLM in the presentation evaluation MLM 112, the trained MLM from the engagement evaluation MLM 114 then uses a loss function that quantifies the error between the predicted output and the ground truth for a given training sample. In other words, the loss function can be used to guide the learning process by updating the network weights in a way that improves the accuracy of future predictions. This process may continue until the difference between the prediction and the correct targets is minimal.

During inference, the trained MLM from the engagement evaluation MLM 114 does not re-evaluate or adjust the layers of the MLM based on the results. Instead, the inference applies knowledge from the trained MLM and uses it to generate an evaluation (e.g., engagement score) and engagement feedback. Accordingly, when a new unknown dataset (e.g., new presentation) is input through the trained MLM in the engagement evaluation MLM 114, the trained MLM outputs a prediction of an engagement level based on the video streams from the cameras 109*a*, 109*b*, 109*n*, the audio stream from the microphones 113*a*, 113*b*, and 113*n*, and the capture screens of the computing devices 111*a*, 111*b*, 111*n* in the form of a score.

Optionally, during training of the MLM in the optional topic determination MLM 116, the topic training dataset will include (a) presentation materials labeled and annotated with subject matter, key topics, or keywords and phrases to extract and analyze a textual and visual content of the presentation to infer the subject matter and individual topics, (b) topic labeled datasets comprising at least domain-specific data labeled and annotated with subject matter tags and topics to train the topic MLM to recognize subject matter and topics, (c) audio and video presentation data comprising at least presentation recordings and corresponding audio streams labeled and annotated with subject matter and topics to identify spoken words, tone, and context for recognizing topics, and (d) ground truth labels for the presentation materials, topic labeled datasets, or audio and video presentation data to serve as a target output for the topic MLM.

In some aspects, an optimizer such as Adam or SGD may be used to train the models in the presentation evaluation MLM 112, the engagement evaluation MLM 114, and the optional topic determination MLM 116. In some aspects, the data may be split into training, validation, and test sets. In these aspects, the MLMs from the presentation evaluation MLM 112, the engagement evaluation MLM 114, and the optional topic determination MLM 116 are trained on the training dataset and then validated by the validation sets to tune hyperparameters.

The computing device 115 may execute a scoring engine 120 configured to generate a comprehension score based at least in part on the presentation score from the prepared presentation evaluation MLM and the engagement scores from the prepared engagement evaluation MLM. The comprehension score is a measure of how well each audience member appears to understand the material discussed in the presentation. Specifically, the comprehension score is derived by integrating the presentation score, which evaluates the quality and clarity of the presenter's presentation based on the output of a presentation evaluation MLM, with engagement scores of each audience member based on the output of the engagement evaluation MLM. As mentioned above, the presentation score reflects how effectively the content is structured and delivered, while the engagement scores measure the audience's responsiveness and interaction levels during the presentation. The scoring engine's ability to combine these metrics provides a nuanced understanding of both the presenter and their presentation's efficacy and its impact on the audience. This system is significant as it enables data-driven insights for improving communication strategies, ensuring presentations are not only well-crafted but also engaging and impactful for their intended audiences.

In some aspects, the scoring engine 120 functions by aggregating and analyzing outputs from the two specialized MLMs: the presentation evaluation MLM 112 and the engagement evaluation MLM 114. In some aspects, the scoring engine 120 may apply predefined or dynamically learned weights to balance the relative importance of these scores, ensuring the final comprehension score accurately reflects the interplay between content and presentation quality and audience engagement and/or participation. Advanced algorithms may then integrate the weighted scores to generate a unified comprehension score that quantifies the overall effectiveness of the presentation in conveying information and engaging the audience. This comprehensive evaluation enables actionable feedback, highlighting areas for improvement and identifying strategies that enhance presentation impact.

The computing device 115 may execute an optional recommendation engine 122. Using the data from the video streams, audio streams, screen captures, presentation score, engagement score, and/or comprehension score, a real-time presenter recommendation and/or a real-time audience member recommendation is generated. The real-time presenter recommendation are recommendations on how to more effectively present and engage the audience members. In some aspects, the real-time presenter recommendations may be generated post-presentation. As a non-limiting example, the real-time presenter recommendations may include at least one of introducing a poll or quiz, calling on an audience member, acknowledge the contribution of an audience member, slow down, speed up, repeat material, summarize material, present a visual aid, or introduce a break.

In addition, the real-time and/or post-presentation recommendations for audience members are personalized recommendations for each audience member on how to be more engaged with the presenter and presentation. As a non-limiting example, the real-time presenter recommendations may include at least one of taking notes, asking questions, responding to prompts, using non-verbal feedback, participating in a chat, adjusting a computing environment, or changing a physical posture.

The computing device 115 may execute a display module 124. The display module 124 may be configured to generate and display the scores and feedback for the presenter 101 and the audience members 107*a*, 107*b*, 107*n* and/or at least a list of topics for the presentation on their respective computing devices 115, 111*a*, 111*b*, 111*n*. Generally, the display module 124 is responsible for managing and rendering the visual components of the user interface by handling the presentation of information to the user, ensuring that data and controls are displayed correctly and consistently across the UI.

In some aspects, the display module 124 is configured to render or draw all the elements of the UI, such as windows, buttons, text fields, menus, icons, images, and other components. In some aspects, the display module 124 is configured out update the UI when the data changes or user interactions occur (e.g., clicking a button or typing in a text box) such that the display module updates the UI accordingly. This could mean refreshing a portion of the screen, changing the state of a button, or displaying new data. In other words, the display module 124 may be considered the "view" part of a model-view-controller (MVC) or similar design pattern. It serves as the layer that presents data to the user and receives input to and from the computing devices 115, 111*a*, 111*b*, 111*n*.

It should be noted that although the analysis and evaluation of the presentation material, the presenter, and the engagement of the audience members described in the present disclosure are heavily simplified. One skilled in the art will appreciate that the MLMs utilized may have significantly large datasets with highly specific details. For example, features indicating personal engagement of the audience members may include at least one of time in front of camera, speaking time, sharing time, reactions, raising their hand, messaging in the chat, focus on the presentation, switching between browser tabs, etc. As another example, features indicating the quality and effectiveness of a presenter may include at least one of clarity of speech (e.g., evaluation of pronunciation, enunciation, pace, and volume), structure and organization (e.g., assessment of how well the presentation is organized, including logical flow, clear transitions between topics, and adherence to a coherent narrative), engagement and interaction (measurement of the presenter's ability to connect with the audience through eye contact, gestures, interactive questions, and responses to audience cues), non-verbal communication (e.g., analysis of body language, posture, facial expressions, and hand gestures to determine whether they reinforce the message or create distractions), use of visual aid (e.g., evaluation of the effectiveness of slides, charts, or other visual tools in complementing the spoken content and aiding comprehension), adaptability (e.g., evaluation of the presenter's ability to adjust based on audience feedback, such as modifying the pace, tone, or content emphasis to maintain interest and understanding), energy and enthusiasm (e.g., observation of the presenter's enthusiasm and passion for the topic, which can influence audience interest and engagement), time management (e.g., assessment of whether the presenter adheres to the allotted time, balancing depth of information with pacing to cover key points effectively), and audience engagement metrics (e.g., use of audience data, such as their responses, body language, or interaction levels, to gauge how effectively the presenter maintains attention and participation). This type of analysis would be beyond the capabilities of the human mind because the amount of data to be identified, considered, and processed when evaluating both a presenter and each individual audience members. It should also be noted that although the present disclosure is described in terms of presentations are for illustrative purposes only, the methods and systems described in the present disclosure can be applied to any type of presentation such as a lecture, sales pitch, business meeting, speeches, storytelling, business strategy meetings, funding proposals, team meetings, workshops, stand-up comedy acts, event hosting and the like.

Figure 2:
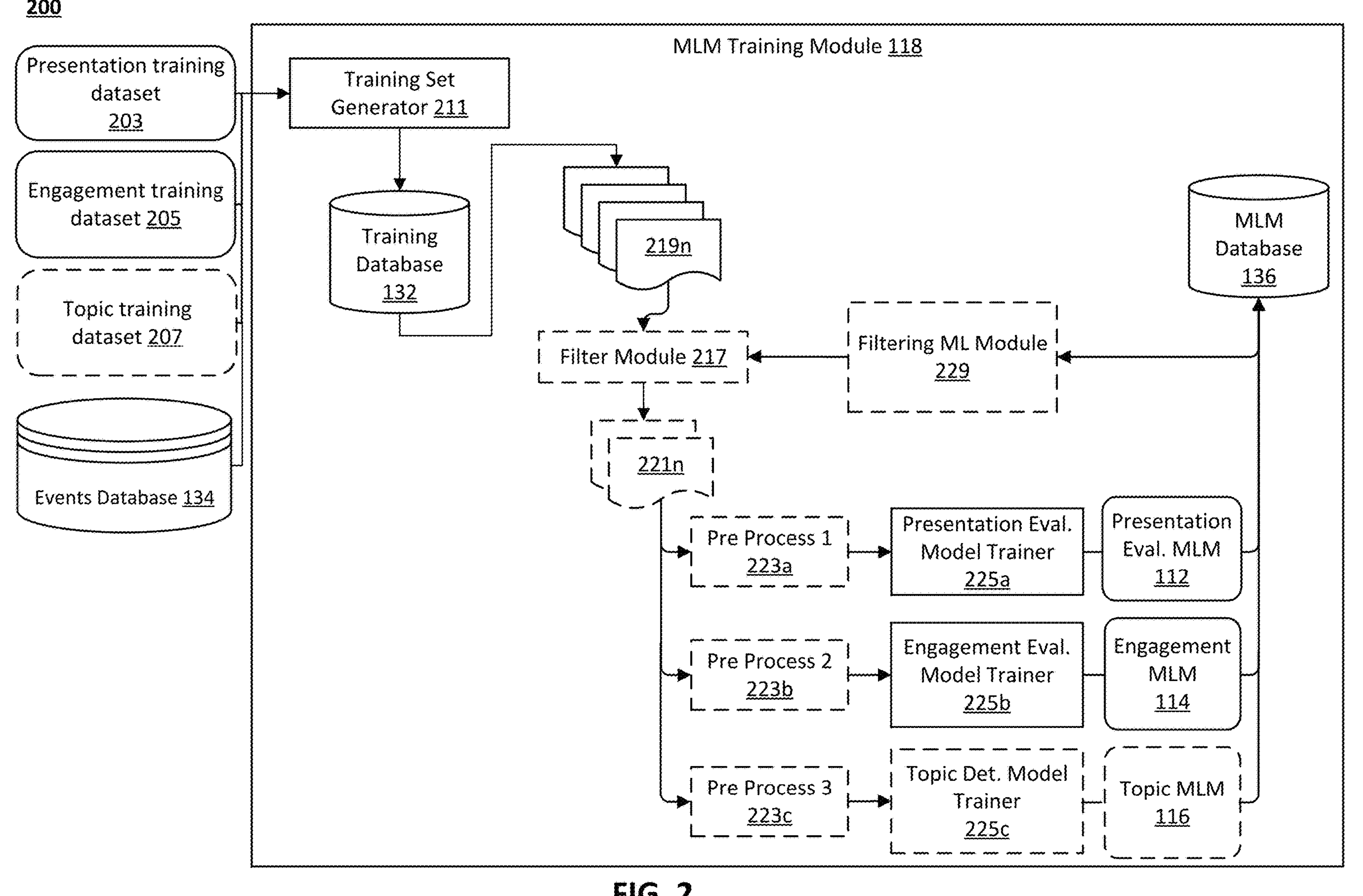
FIG. 2 is a block diagram illustrating a system for preparing machine learning models (MLMs) to assess a presentation of a presenter and engagement level for audience members according to aspects of the present disclosure.

FIG. 2 is a block diagram illustrating a system for preparing MLMs to assess a presentation of a presenter and engagement level for audience members according to aspects of the present disclosure. As shown in example 200, the MLM training module 118 is configured to build and train specialized MLMs with inference to perform particular tasks. This enables the specialized MLMs to develop an ability to perform particular objectives on inputs that are not part of a training dataset. By subjecting the specialized MLMs to large amounts of unlabeled and/or labeled training data sets, the specialized MLMs may perform particular tasks such as evaluating a presentation by generating a presentation score, evaluating an engagement of the audience members by generating an engagement score, and/or identifying a subject matter for the presentation.

Supervised learning is effective for tasks such as classification (assigning inputs to predefined categories) and regression (predicting continuous values) since it relies on the availability of labeled data for both training and evaluation phases. In supervised learning, the MLM training module 118 trains the algorithm on a labeled dataset, where each input has a corresponding output. The goal is to learn a mapping function from inputs to outputs, allowing the algorithm to make predictions or classifications on new, unseen data. The process typically involves the following steps: training, model building, prediction, feedback, and adjustment. In the training phase, the MLM training module 118 provides the algorithm with a training dataset including input-output pairs. The algorithm learns the mapping function that relates inputs to outputs through an iterative process, adjusting its internal parameters based on the provided examples.

During model building, the algorithm creates a model that can generalize from the training data to make predictions on new, unseen data. The model's complexity varies based on the algorithm used. For example, the model may be a simple linear regression model or a complex neural network. During the prediction phase, the MLM training module 118 inputs test inputs (i.e., inputs with known outputs) into the model, which generates predictions or classifications based on what it has learned during training. The accuracy of predictions is evaluated by comparing them to the known outputs in a validation or test dataset. During the feedback and adjustment phase, machine refines the model based on feedback from its predictions. If the predictions differ from the actual outputs, the algorithm adjusts its internal parameters to minimize the errors. The performance of the trained model is assessed using metrics such as accuracy, precision, recall, etc., depending on the nature of the problem.

In some aspects, the MLM training module 118 includes at least a training database 132 configured to store the raw training data 219*n* and corresponding labels, a MLM database 136 to store the trained models (e.g., the prepared presentation evaluation MLM 112, the prepared engagement evaluation MLM 114, and/or an optional prepared topic determination MLM 116). In some aspects, the MLM training module 118 may include an optional filtering MLM 229 and an optional filter module 217 configured to filter data from the training database 132 for training by removing poorly generated training data.

Training data from the presentation training dataset 203, engagement training dataset 205, optional topic training dataset 207, and events from the events database 134 is received into the MLM training module 118 via the training set generator 211. Details about the data included in each training dataset is described in more detail above with FIG. 1.

An optional filter module 229 is configured to filter out bad training images and/or data to clean up the training data in the training dataset 219*n*. In some examples, the optional filter module 217 may be a neural network. In some examples, the optional filter module 217 is a mathematical model. In some examples, the cleaned training dataset 221*n* then undergoes optional preprocessing steps depending on which neural network or model is being trained.

The optional preprocess 1 223*a*, preprocess 2 223*b*, and preprocess 3 223*c* are automated processes that modify the raw data received from 219*n* (or cleaned training dataset 221*n*) and prepare the raw data as input to the respective model trainers (e.g., presentation evaluation model trainer 225*a*, engagement evaluation model trainer 225*b*, or optional topic determination model trainer 225*c*). These may be described in the MLM training module 118 as snippets of code that prepares the datasets. In some examples, the preprocessing module (e.g., preprocess 1 223*a*, preprocess 2 223*b*, and preprocess 3 223*c*) for a particular trainer may be an automated script or code that will be setup the first time any model is trained.

The presentation evaluation model trainer 225*a*, engagement evaluation model trainer 225*b*, or optional topic determination model trainer 225*c* are the scripts or code that train the respective models. The presentation evaluation model trainer 225*a*, engagement evaluation model trainer 225*b*, or optional topic determination model trainer 225*c* may be a script or code that holds the instructions on how a model should be trained (e.g., optimization method, model architecture, dataset division, etc.) and runs the training. The presentation evaluation model trainer 225*a*, engagement evaluation model trainer 225*b*, or optional topic determination model trainer 225*c* each take as input the raw or filtered processed training data and train the presentation evaluation model trainer 225*a*, engagement evaluation model trainer 225*b*, or optional topic determination model trainer 225*c* to achieve their specific objectives, respectively.

In summary, the raw dataset 219 or cleaned dataset 221*n* may optionally go through different preprocessing steps 223*a*, 223*b*, 223*c* and then a corresponding presentation evaluation model trainer 225*a*, engagement evaluation model trainer 225*b*, or optional topic determination model trainer 225*c* to generate a prepared presentation evaluation MLM 112, a prepared engagement evaluation MLM 114, or an optional prepared topic determination MLM 116. In some examples, each of these models may be a MLM or a neural network.

As a non-limiting example and as discussed above, the machine learning may be a neural network. The neural network models are designed using a set of hyperparameters that define high-level aspects of their architecture and training process. These hyperparameters include but are not limited to a combination of architecture type, number of layers, memory size, number of attention heads, learning rate, batch size, optimization algorithm, and the like. Based on these hyperparameters, learnable variables called parameters are initialized, which define the mathematical function that the neural network represents.

The raw training dataset 219*n* used for training may include noise and bad training images from the training database 132. Accordingly, to create a clean and filtered training dataset, the optional filter module 217 is configured to filter out unwanted data points from the raw training dataset 219*n* by developing smaller, less accurate systems based on patterns and metadata information.

During the training process, the presentation evaluation model trainer 225*a*, the engagement evaluation model trainer 225*b*, or the optional topic determination model trainer 225*c* are presented with input data and labels of actual values, and the optimization objective, which aims to minimize the difference between the actual value and the predicted value, is calculated. The optimization algorithm updates the parameters of the presentation evaluation model trainer 225*a*, the engagement evaluation model trainer 225*b*, or the optional topic determination model trainer 225*c* to reduce the value of the objective. This process is repeated for several iterations until the parameters do not change anymore. This process is repeated for various combinations of hyperparameters, and the model with the smallest label prediction error is selected as the final model.

When a new model (e.g., the prepared evaluation MLM 112, the prepared engagement evaluation MLM 114, and the optional prepared topic MLM 116) is created, and a new process for filtering and automated labeling is established, it is added to the MLM database 136 in the MLM training module 118. This enables the new model to be part of the closed-loop model update process. Optionally, at regular intervals, data which is continuously collected can be filtered, labeled, and used to update old models by an optional filtering machine learning module 229. In some examples, the optional filtering machine learning module 229 is a neural network. In some examples, the optional filtering machine learning module 229 is a mathematical model. This approach may capture changes in the data over time.

Figure 3:
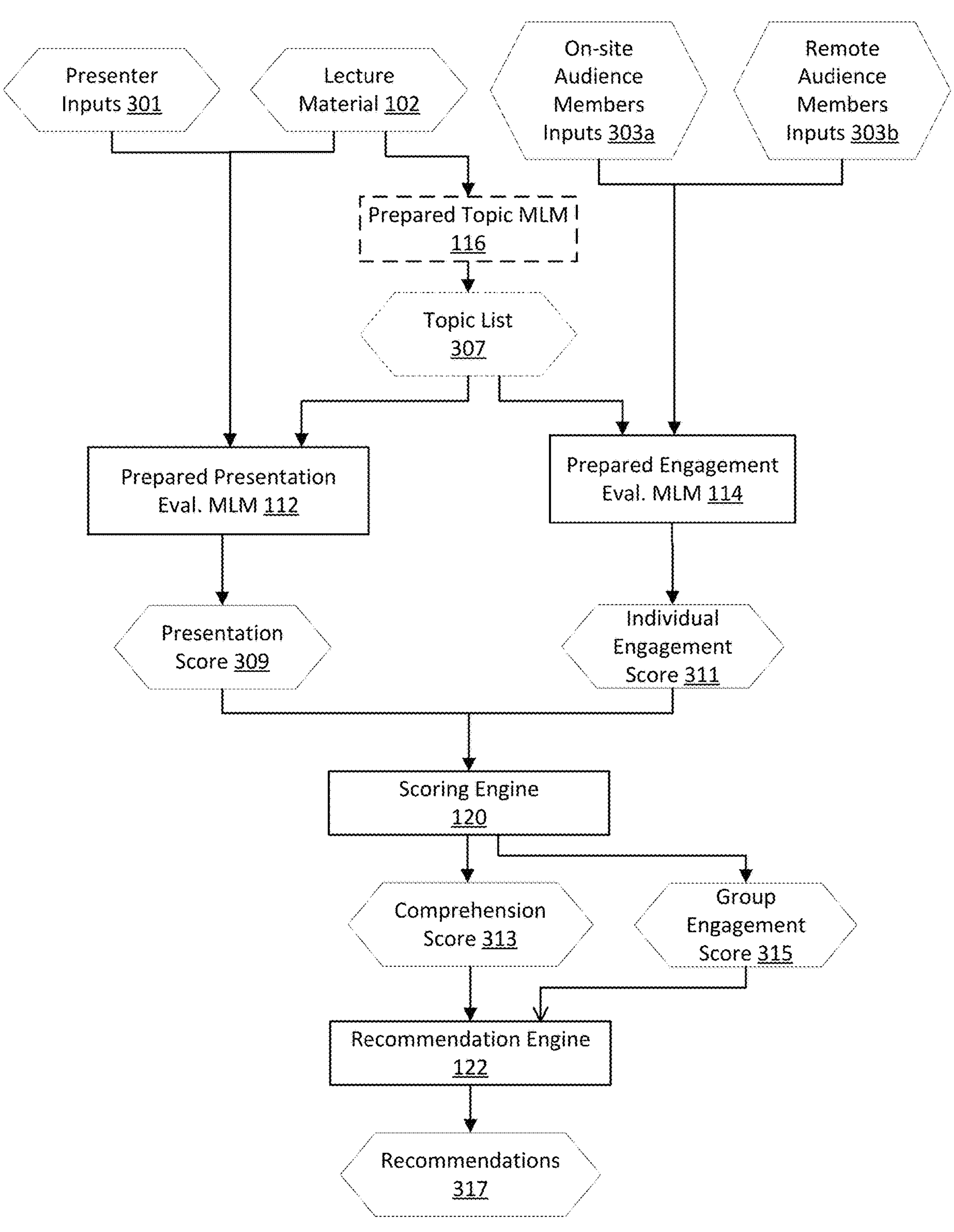
FIG. 3 is an example flowchart for generating a comprehension score based on a presentation and engagement score according to aspects of the present disclosure.

FIG. 3 is an example flowchart for generating a comprehension score, an engagement score, and recommendations based on the presentation and engagement score according to aspects of the present disclosure. In various implementations, the method 300 is performed by a device with one or more processors and non-transitory memory that performs intent prediction. In some implementations, the method 300 is performed by processing logic, including hardware, firmware, software, or a combination thereof. In some implementations, the method 600 is performed by a processor executing code stored in a non-transitory computer-readable medium (e.g., a memory). The method 300 describes a method for generating a comprehension score, an engagement score, and recommendations based on the presentation and engagement score.

The method 300 begins by inputting presenter inputs 301 (e.g., video stream data from the camera 103 and audio stream data from the microphone 105) and lecture material 102 into the prepared presentation evaluation MLM 112 to output a presentation score 309. The presenter inputs 301 reflect the presenter's visual and verbal communication, such as gestures, facial expressions, speech clarity, and tone. Additionally, the prepared presentation evaluation MLM 112 integrates lecture material 102, such as slides or notes, to ensure alignment with the presenter's delivery. These presenter inputs 301 are then processed by the prepared presentation evaluation MLM 227*a*, a MLM prepared to analyze and assess presentations using techniques such as natural language processing, audio analysis, and computer vision. The presentation and engagement assessment engine 104 evaluates various aspects of the presentation, including the presenter's body language, vocal delivery, and the coherence of their content, ultimately outputting a presentation score 309.

The presentation score 309 offers an objective and standardized way to evaluate presentations, reducing the subjectivity associated with human evaluations. Presenters can use this presentation score 309 as feedback to identify strengths and areas for improvement, such as enhancing clarity, refining body language, or ensuring better alignment between speech and visual aids. The automated nature of the presentation and engagement assessment engine 104 saves time and resources, particularly in scenarios requiring the evaluation of multiple presentations. It also supports learning and development by providing detailed, data-driven insights to improve communication skills. Moreover, by relying on consistent algorithms, the presentation and engagement assessment engine 104 minimizes biases that can occur in human assessments. This scalable and insightful evaluation method has applications across diverse domains, fostering improvement and enabling objective assessments in educational and professional settings.

The method 300 also inputs in-person audience member inputs 303*a* and remote audience member inputs 303*b* (e.g., video stream data from the cameras 109*a*, 109*b*, 109*n*, audio stream data from the microphones 113*a*, 113*b*, 113*n*, and screen captures from the computing devices 111*a*, 111*b*, 111*n*) into the prepared engagement evaluation MLM 114 to output an individual engagement score 311 for each audience member. Specifically, the presentation and engagement assessment engine 104 gathers data from audience members (e.g., audience members 107*a*, 107*b*, 107*n* from FIG. 1), including video streams from cameras 109*a*, 109*b*, 09*n*, audio streams from microphones 113*a*, 113*b*, 113*n*, and screen captures from their computing devices 111*a*, 111*b*, 111*n*. The data is processed by a prepared engagement evaluation MLM 112, a MLM prepared to assess engagement levels using techniques like computer vision, audio analysis, and activity monitoring. The prepared engagement evaluation MLM 112 analyzes each audience member's responses and behaviors to produce an individual engagement score, reflecting their level of attention, interest, or participation during the presentation.

In-person audience member inputs 303*a* and remote audience members inputs 303*b* provide detailed information about audience behavior, such as facial expressions, body language, verbal reactions, and interactions with their devices during the presentation. The individual engagement score 315 provide real-time, objective, and granular insights into each audience member's engagement of the presentation. Accordingly, individual engagement scores 315 for remote audient members and in-person audience members may be graded differently for participation due to differences in visibility, communication methods, and access to resources. For example, in-person participants are typically evaluated based on verbal contributions, body language, and in-person engagement, which are more easily observed by instructors. In contrast, remote participants often rely on written forms of communication such as chat messages, discussion board posts, or digital reactions, and their participation may also be tracked through platform analytics like login times or activity levels. These differing modes of interaction necessitate distinct grading approaches to ensure fairness. Remote learners may face technological challenges or limited access to equipment, so instructors often adapt participation criteria to account for these barriers. Ultimately, the goal is to create an equitable environment where all students, regardless of their location, have an opportunity to demonstrate engagement and contribute meaningfully.

For presenters, understanding the individual engagement scores 315 enables the presenters to adjust their delivery, content, or pacing to better capture and maintain audience focus and interest. As an example, in educational settings, individual engagement scores 315 can help instructors identify learners who may require additional support or tailored teaching methods. As another example, in corporate or sales pitches, the individual engagement scores 315 supports the optimization of presentations, pitches, or performances to maximize impact or focus on particular individuals. The presentation and engagement assessment engine 104's reliance on automated and consistent algorithms minimizes the subjectivity and biases of manual observation while offering scalable insights for large or remote audiences.

The presentation score 309 and the individual engagement score 311 are then input into a scoring engine 120 to output a comprehension score 313 for each audience member. The comprehension score 313 reflects how well the audience members understood or absorbed the content of the presentation. In this way, the individual comprehension score 313 provides detailed, personalized insights into how well an individual audience member understood the content of the presentation. As an example, in an educational setting, the comprehension score 313 can help identify which learners are struggling to grasp the material, enabling targeted interventions or adjustments to teaching methods. As another example, in a corporate setting, the comprehension score 313 can assess the effectiveness of training programs and ensure that employees understand critical information. As yet another example, in a sales pitch, the comprehension score 313 can help the presenter zero in or "close" individuals with a high comprehension score 313 or help the presenter re-explain or adjust their presentation methods if an individual has a low comprehension score 313. The integration of presenter performance and audience engagement ensures that comprehension scores 313 are not solely based on the presenter's delivery or the audience's engagement in isolation, but on a nuanced interaction of both factors. This holistic assessment fosters better communication supports adaptive strategies for improving understanding, and enhances the overall effectiveness of presentations in educational, professional, and public speaking contexts.

In some aspects, the scoring engine 120 will generate a group engagement score 315 that summarizes an overall engagement score for the group of audience members. Specifically, the scoring engine 120 generates a group engagement score 315 by consolidating the individual engagement scores 311 of all audience members into a unified metric that reflects the overall level of engagement across the entire group. Each audience member's engagement score 311, which is derived from behavioral data such as attentiveness, participation, and interactions during the presentation, is fed into the scoring engine 120. Using statistical aggregation or machine learning algorithms, the scoring engine 120 computes an overall engagement score that represents either the average, median, or cumulative engagement of the group. This process provides a single, high-level measurement of how well the audience collectively responded to the presentation.

The significance of the group engagement score 315 lies in its ability to offer a holistic view of audience interaction and responsiveness. For presenters, it serves as a valuable tool for assessing the success of their presentation in capturing and maintaining the audience's interest. In educational settings, the group engagement score 315 can help instructors gauge the effectiveness of their teaching methods and identify whether the class, as a whole, is engaged with the material. In corporate environments, the group engagement score 315 provides actionable feedback for improving team training sessions, meetings, or large-scale presentations. Furthermore, for event organizers or remote sessions with large audiences, the group engagement score 315 enables quick and efficient evaluation of overall audience satisfaction and participation. This group engagement score 315 aids in identifying broader trends, facilitating data-driven improvements to communication strategies, and ensuring more impactful presentations across various contexts.

In some aspects, the method 300 may include generating a topic list containing important topics for a subject matter of the presentation by inputting the lecture material 102 into an optional prepared topic determination MLM 116. This is accomplished by inputting the lecture material 102 into the optional prepared topic determination MLM 116, which uses natural language processing (NLP) and other techniques to extract and organize key topics from the content of the lecture material 102. Once the topic list 307 is generated, it is used to guide the prepared presentation evaluation MLM 112 and the prepared engagement evaluation MLM 114 to analyze the presentation and audience engagement on a topic-by-topic basis. This enables the presentation and engagement assessment engine 104 to generate presentation scores 309 and individual engagement scores 311 for each topic in the topic list 307, providing granular feedback on how well each specific area was presented by the presenter and received by the audience members.

The method 300 then inputs the comprehension score 313 and, in some cases, the group engagement score 315 into an optional recommendation engine 122 to generate a real-time presenter recommendation and a real-time engagement recommendation for each audience member.

Specifically, the comprehension score 313 and, optionally, the group engagement score 315 are processed by the optional recommendation engine 122, which uses algorithms or MLMs to generate two types of real-time recommendations 317. The first is a real-time presenter recommendation, offering the presenter strategies to improve delivery, such as adjusting pacing, emphasizing specific topics, or adopting a more engaging tone. The second is a real-time engagement recommendation, which provides personalized advice for improving individual audience members' engagement, such as encouraging participation, offering additional clarifications, or introducing interactive elements.

By delivering real-time recommendations, the presentation and engagement assessment engine 104 allows presenters to dynamically adjust their approach to maintain audience interest and ensure understanding. It also supports personalized learning by tailoring strategies to the needs of individual audience members, which is particularly beneficial in educational and training settings. Additionally, the objective, data-driven nature of the real-time recommendations 317 ensures precision and reduces reliance on intuition or guesswork. This approach improves the overall effectiveness of presentations, enhances audience experiences, and fosters active participation, making it highly versatile for applications in education, corporate training, and live events.

In addition, the method 300 may also generate post-presentation recommendations for the presenter and the audience members. Post-lecture recommendations provide valuable insights for both presenters and audience members, fostering continuous improvement and enhanced learning outcomes. For presenters, these recommendations offer feedback on delivery, content organization, and audience engagement, helping them refine their techniques and address areas needing improvement. For audience members, tailored suggestions support individual learning by addressing comprehension gaps and providing resources for deeper engagement with the material. By creating a feedback loop, post-lecture recommendations ensure future presentations are more effective and impactful while promoting better understanding and participation from the audience.

Figure 4:
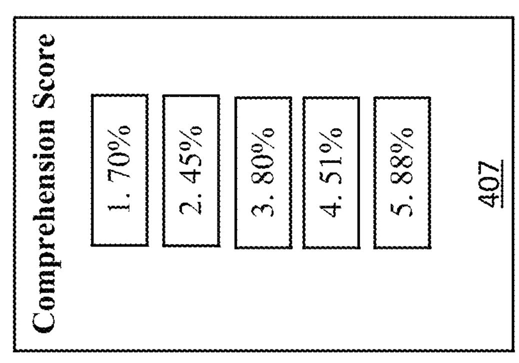
FIG. 4 is an example of a topic list and presentation, engagement, and comprehension scores for each topic according to aspects of the present disclosure.
Figure 4:
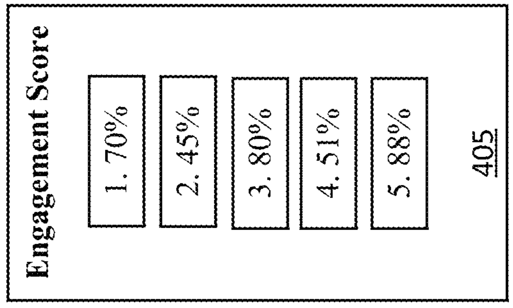
Figure 4:
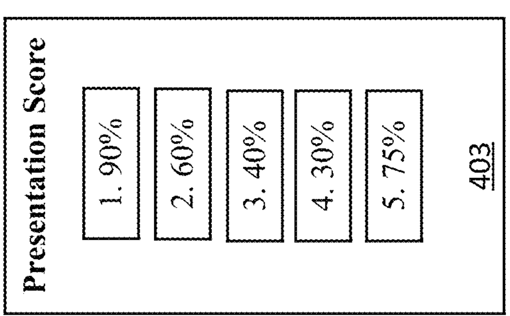
Figure 4:
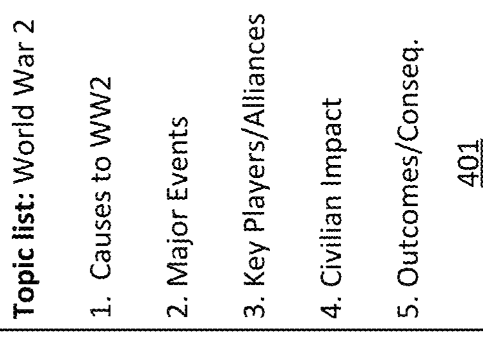

FIG. 4 is an example of a topic list and presentation, engagement, and comprehension scores for each topic according to aspects of the present disclosure. Specifically, example 400 shows a topic list 401 generated for a presentation on World War 2. As explained above in FIG. 3, the prepared presentation evaluation MLM 112 may generate a respective presentation score 403 and the prepared engagement evaluation MLM 114 may generate a respective individual engagement score 405 each separate topic in the topic list 401. Accordingly, the scoring engine 120 may generate a presentation score 403, an engagement score 405, and/or comprehension score 407 for each separate topic in the topic list. This systematic scoring approach allows for precise evaluation of presentation effectiveness, audience engagement, and topic comprehension across various subject areas.

Figure 5:
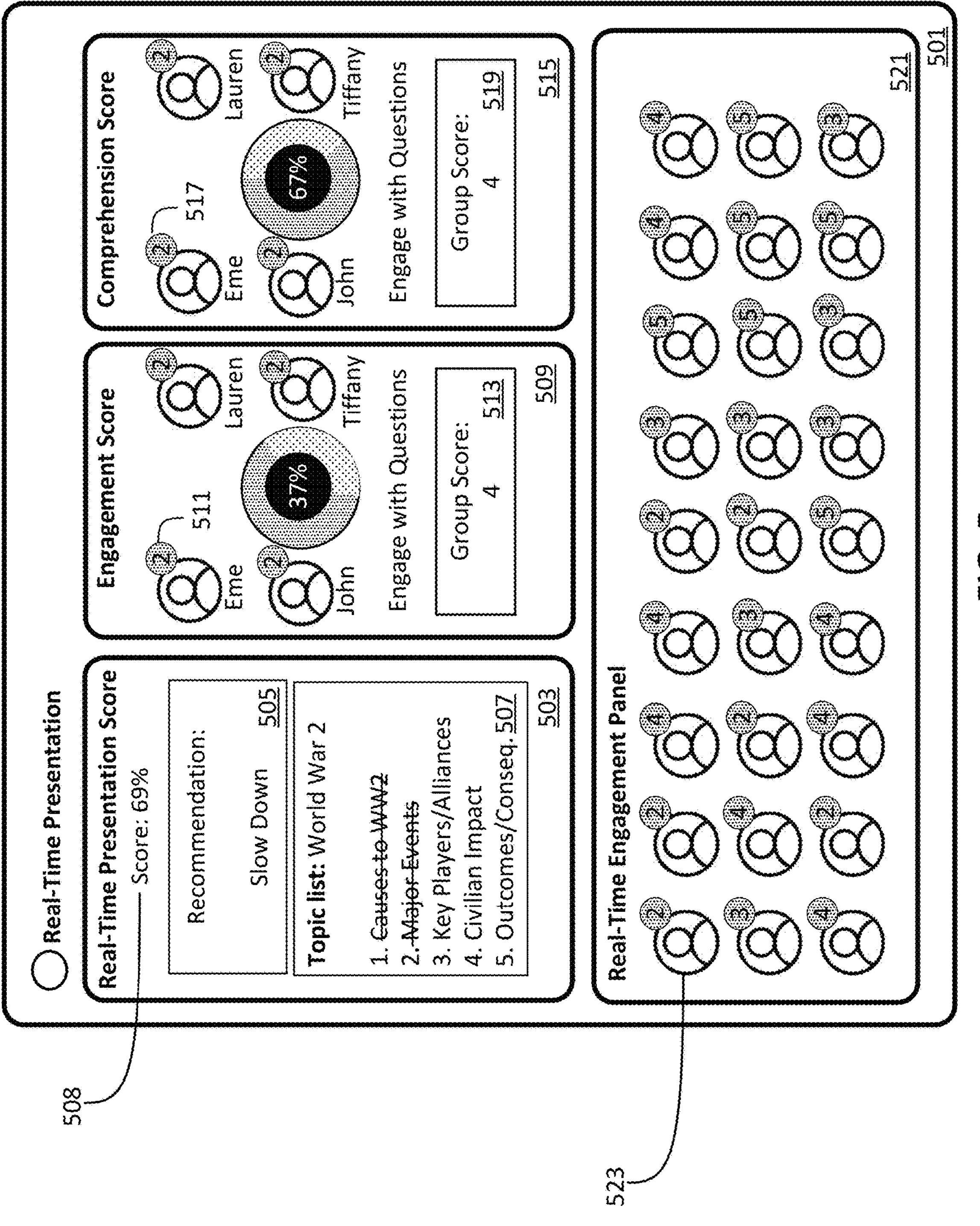
FIG. 5 is an example of a user interface for presenting real-time scores and recommendations for presenters and audience members according to aspects of the present disclosure.

FIG. 5 is an example of a user interface (UI) 501 for presenting real-time scores and recommendations for presenters and audience members according to aspects of the present disclosure.

As shown in example 500, the UI 501 includes a real-time presentation panel 503 that shows a real-time presentation score 508, a real-time presenter recommendation 505, and an optional topic list 507, a real-time engagement panel 509 that shows a real-time individual engagement score 511 for each audience member and an overall group engagement score 513, a real-time comprehension score panel 515 that shows a real-time comprehension score 517 an a group comprehension score 519, and a real-time engagement panel 521 that shows each audience member and a corresponding real-time engagement score 523.

It will be understood by those skilled in the art that the specific UI elements and layout in the UI 501 is not limited to example 500. The technical solution according to the present disclosure may include more or fewer panels and/or UI elements.

Figure 6:
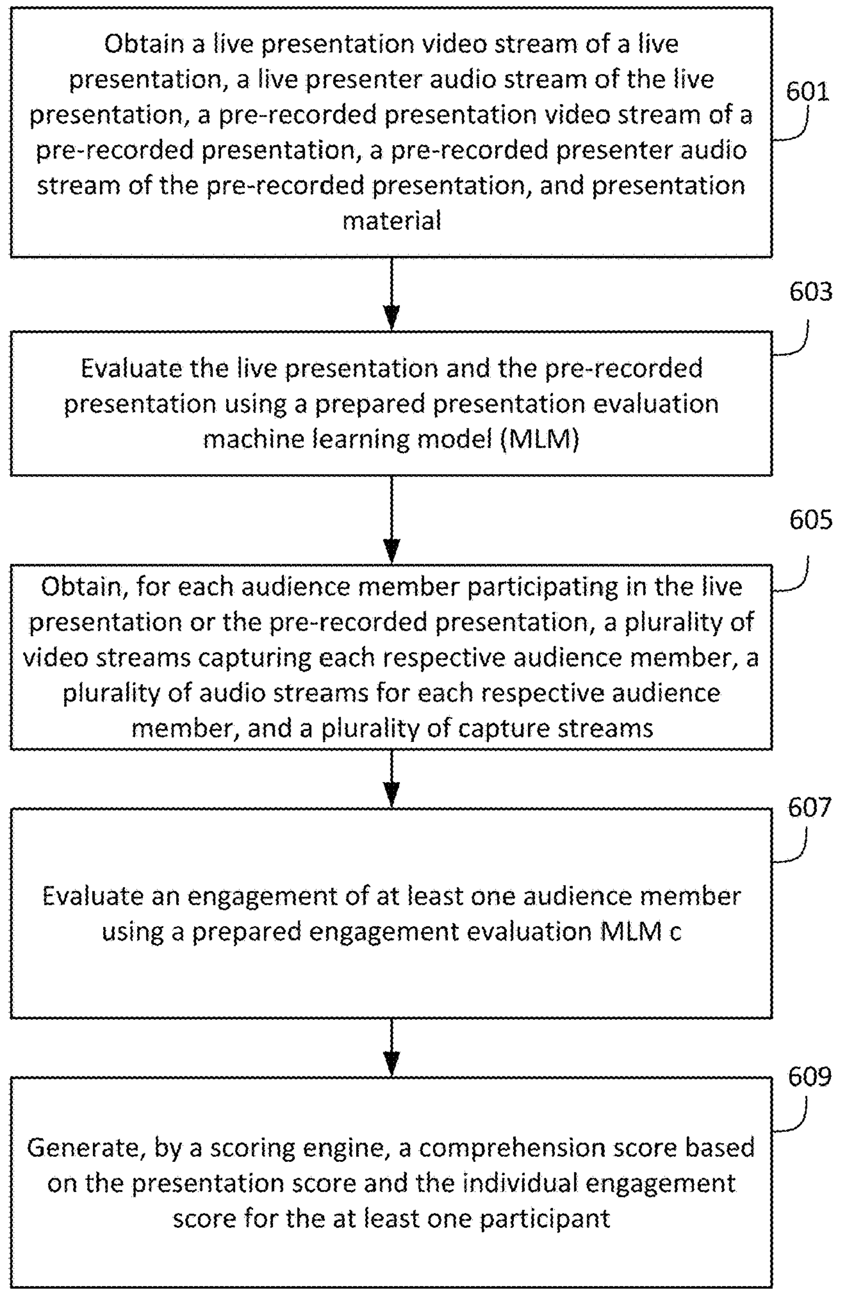
FIG. 6 is an example method for a machine learning (ML)-based assessment of a presentation by a presenter and engagement of audience members according to an aspect of the present disclosure.

FIG. 6 is an example method for a machine learning (ML)-based assessment of a presentation by a presenter and engagement of audience members according to an aspect of the present disclosure. In various implementations, the method 600 is performed by a device with one or more processors and non-transitory memory that performs intent prediction. In some implementations, the method 600 is performed by processing logic, including hardware, firmware, software, or a combination thereof. In some implementations, the method 600 is performed by a processor executing code stored in a non-transitory computer-readable medium (e.g., a memory). The method 600 describes a method for assessing a presentation and engagement of the presentation by audience members.

At 601, the method 600 may include obtaining a presentation video stream of a presentation, a presenter audio stream of a presenter, and presentation material. As an example, referring back to FIG. 1, the collection module 108 may obtain the presentation video stream from the camera 103 of the presenter 101, the audio stream from a microphone 105 of the presenter and presentation material 102.

At 603, the method 600 may include evaluating the presentation using a prepared presentation evaluation MLM configured to generate a presentation score based on the presentation video stream, the presenter audio stream, and the presentation material. As an example, referring back to FIGS. 1-3, the prepared presentation evaluation MLM 112 may generate a presentation score based on the presentation video stream from the camera 103, the presenter audio stream from a microphone 105, and the presentation material 102.

In some aspects, the method 600 may include: preparing the presentation evaluation MLM by: (1) providing, to the presentation evaluation MLM, a presentation training dataset comprising at least one of: (a) presenter video streams of presenters presenting a presentation labeled and annotated with quality scores for clarity, engagement, accuracy, or content delivery to evaluate at least one of body language, gestures, facial expressions, or visual aids of the presenter, (b) corresponding audio streams labeled and annotated for features of at least one of voice quality, pauses, tone, or fluency to analyze speech delivery, clarity, tone, or impact of the presenter, (c) presentation material aligned with the labeled presenter video streams labeled and annotated to assess at least one of content quality, relevance, or alignment between the presentation and the presentation materials, and (d) ground truth labels for the presenter video streams, the corresponding audio streams, or the presentation material to serve as a target output for the presentation evaluation MLM model; and (2) preparing the presentation evaluation MLM using the presentation training dataset. As an example, referring back to FIGS. 1-2, the MLM training module 118 may train and/or prepare the presentation evaluation MLM 112.

At 605, the method 600 may include obtaining, for each audience member participating in the presentation, a plurality of video streams capturing each respective audience member, a plurality of audio streams for each respective audience member, and a plurality of capture streams capturing an interaction of each audience member and a respective computing device. As an example, referring back to FIGS. 1 and 3, the collection module 108 may obtain, for each audience member 107*a*, 107*b*,107*n*, a plurality of video streams from cameras 109*a*, 109*b*, 109*n* capturing each respective audience member 107*a*, 107*b*, 107*n*, a plurality of audio streams from microphones 113*a*, 113*b*, 113*n* for each respective audience member 107*a*, 107*b*, 107*n*, and a plurality of capture streams from the computing devices 111*a*, 111*b*, 111*n* capturing an interaction of each audience member 107*a*, 107*b*, 107*n* and a respective computing device 111*a*, 111*b*, 111*n*.

At 607, the method 600 may include evaluating an engagement of at least one audience member using a prepared engagement evaluation MLM configured to generate an individual engagement score for the at least one audience member based on the plurality of video streams, the plurality of audio streams, and the plurality of capture streams. As an example, referring back to FIGS. 1-3, a prepared engagement evaluation MLM 114 may be configured to generate an individual engagement score for at least one audience member based on the plurality of video streams, the plurality of audio streams, and the plurality of capture streams.

In some aspects, the method 600 may include: preparing the engagement evaluation MLM by: (1) providing, to the engagement evaluation MLM, an engagement training dataset comprising at least one of: (a) individual video streams of audience members of a presentation labeled and annotated with facial expressions, gaze direction, body posture, or head movement to capture visual engagement cues, (b) corresponding audio streams labeled and annotated with speech activity, tone analysis, interruptions and pauses, or emotion detection to analyze participation through voice contribution and tone of speech, (c) capture streams of the audience members comprising at least one of keyboard input, mouse movements, or screen interactions, the capture streams may be labeled and annotated with active engagement, passive behavior, or multitasking to measure interaction of the audience members with a respective computing device, (d) an event list comprises at least one of interaction events, participation events, attention-related events, engagement-related events, time-based events, or behavioral and biometric events annotated with engagement levels, activity frequency, or contribution quality to capture session-specific events that indicate audience member engagement, and (e) ground truth labels for the individual video streams, the corresponding audio streams, the capture streams, or the event list to serve as a target output for the engagement evaluation MLM; and (2) preparing the engagement evaluation MLM using the provided engagement training dataset. As an example, referring back to FIGS. 1-2, the MLM training module 118 may train and/or prepare the engagement MLM 114.

At 609, the method 600 may include generating, by a scoring engine, a comprehension score based at least in part on the presentation score and the individual engagement score for the at least one audience member. As an example, referring back to FIGS. 1 and 3-4, the scoring engine 120 may generate a group comprehension score 519 based at least in part on the presentation score 508 and the real-time individual engagement score 511.

In some aspects, the method 600 may include evaluating a group engagement of audience members for the presentation by generating, using the score engine, a group engagement score based on a plurality of engagement scores for each audience member participating in the presentation. As an example, referring back to FIGS. 1 and 3-4, the scoring engine 120 may generate an overall group engagement score 513 based on the plurality of real-time individual engagement scores 511 for each audience member.

In some aspects, the method 600 may include, based on the comprehension score, an output of the prepared presentation evaluation MLM, and an output of the prepared engagement evaluation MLM, generating, by a recommendation engine, a real-time presenter recommendation or a real-time audience member recommendation, and displaying, on a display, at least one of the real-time presenter recommendation, the real-time audience member recommendation, the comprehension score, the presentation score, or the individual engagement score for the at least one audience member. As an example, referring back to FIGS. 1-4, the optional recommendation engine 122 may be configured to output a real-time presenter recommendation 505 and/or a real-time audience member recommendation and display the recommendation on a UI 501.

In some aspects, the real-time presenter recommendation may include at least one of: ask a question, introduce a poll or quiz, call on an audience member, acknowledge the contribution of an audience member, slow down, speed up, repeat material, summarize material, present a visual aid, or introduce a break. In some aspects, the real-time audience member recommendation may include at least one of: take notes, ask questions, respond to prompts, use non-verbal feedback, participate in chat, adjust computing environment, or change physical posture.

In some aspects, the method 600 may further include generating, by a recommendation engine, and displaying, on a display, a post-presentation presenter recommendation or a post-presentation audience member recommendation based on outputs of the prepared presentation MLM and the prepared engagement evaluation MLM. In some aspects, the post-presentation presenter recommendation comprises at least one of: changing content of the presentation, changing speech for the presentation, or changing activities of the presentation. In some aspects, the post-presentation audience member recommendation comprises at least one of: assigning additional reading, recommendation to watch video of the presentation, request participation in subsequent lectures, or assign a quiz.

In some aspects, the method 600 may further include: identifying a subject matter for the presentation and recognizing topics for the presentation using a topic MLM configured to determine main topics of the presentation based on the lecture material; evaluating the presentation of each topic of the presentation using the prepared presentation evaluation MLM configured to generate a respective presentation score for each topic based on the subject matter, recognized topic, presentation video stream, the presenter audio stream, and the presentation material; and evaluating the engagement of at least one audience member for each topic of the presentation using the prepared engagement evaluation MLM configured to generate a respective engagement score of the at least one audience member for each topic based on the subject matter, the recognized topic, the plurality of video streams, the plurality of audio streams, and the plurality of capture streams. As an example, referring back to FIGS. 1 and 4, an optional prepared topic determination MLM 116 may be configured to determine that the topic list 401 for World War 2 include: (1) causes to WW2, (2) major events, (3) key players/alliances, (4) civilian impact, and (5) outcomes/consequences.

In some aspects, the method 600 may further include: preparing the topic MLM by: (1) providing, to the topic MLM, a topic training dataset comprising at least one of: (a) presentation materials labeled and annotated with subject matter, key topics, or keywords and phrases to extract and analyze a textual and visual content of the presentation to infer the subject matter and individual topics, (b) topic labeled datasets comprising at least domain-specific data labeled and annotated with subject matter tags and topics to train the topic MLM to recognize subject matter and topics, (c) audio and video presentation data comprising at least presentation recordings and corresponding audio streams labeled and annotated with subject matter and topics to identify spoken words, tone, and context for recognizing topics, and (d) ground truth labels for the presentation materials, topic labeled datasets, or audio and video presentation data to serve as a target output for the topic MLM; and (2) preparing the topic MLM using the provided topic training dataset. As an example, referring back to FIGS. 1-2, a MLM training module 118 may train and/or prepare the optional topic determination MLM 116.

In some aspects, the method 600 may further comprise evaluating a group engagement of audience members for each topic of the presentation using the prepared engagement evaluation MLM configured to generate a respective group engagement score of audience members for each topic based on the subject matter, the recognized topic, the plurality of video streams, the plurality of audio streams, and the plurality of capture streams.

It is understood that the method illustrated by FIG. 6 is exemplary in nature and that the steps described herein may be combined or modified to generate alternative embodiments.

Figure 7:
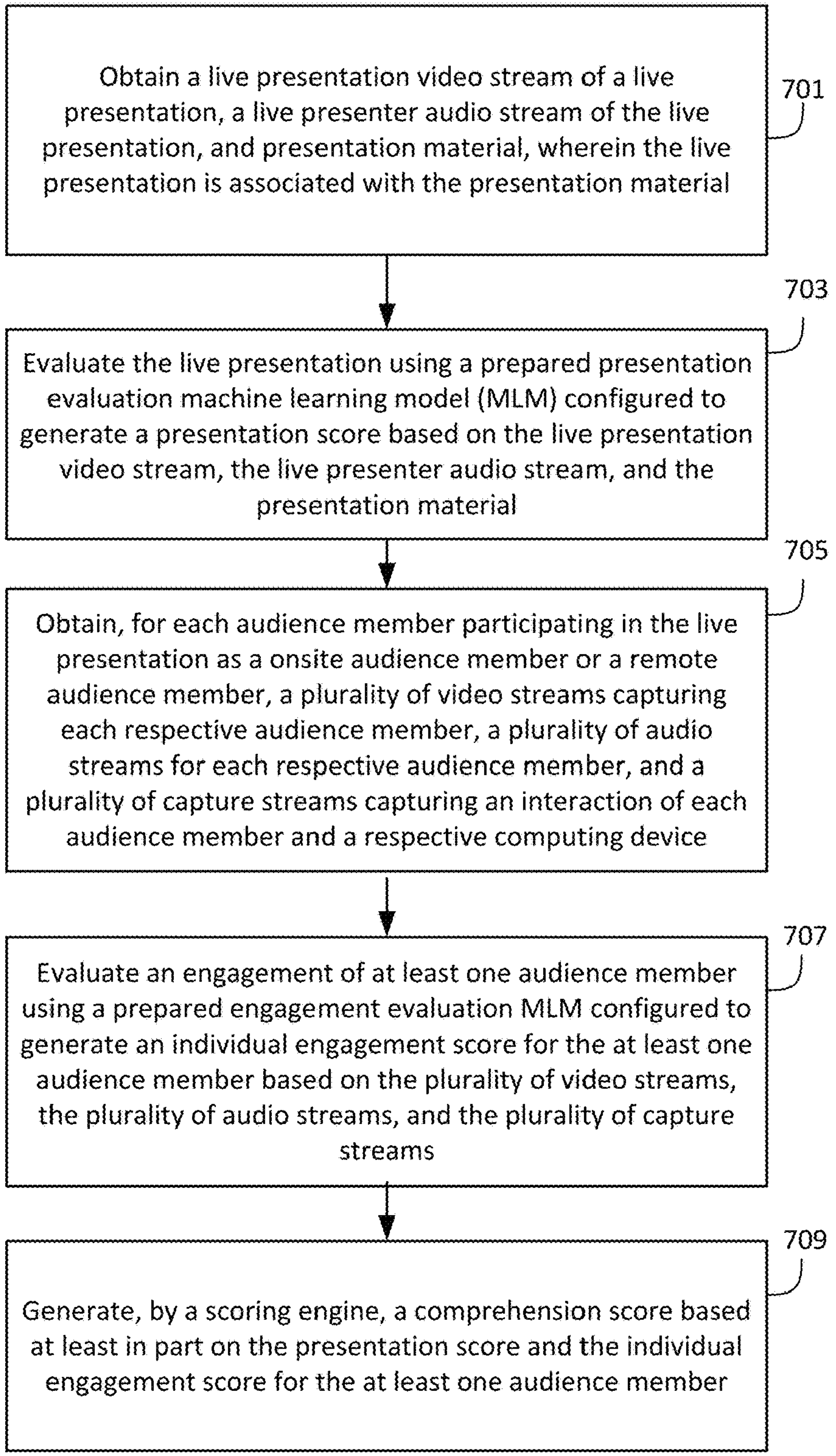
FIG. 7 is an example method for a ML-based assessment of a live presentation by a presenter and engagement of in-person and remote audience members according to an aspect of the present disclosure.

FIG. 7 is an example method for a machine learning (ML)-based assessment of a presentation by a presenter and engagement of audience members according to an aspect of the present disclosure. In various implementations, the method 700 is performed by a device with one or more processors and non-transitory memory that performs intent prediction. In some implementations, the method 700 is performed by processing logic, including hardware, firmware, software, or a combination thereof. In some implementations, the method 700 is performed by a processor executing code stored in a non-transitory computer-readable medium (e.g., a memory).

The method 700 describes a method for ML-based assessment of a live presentation by a presenter and engagement of in-person and remote audience members. The core concept involves ensuring that, when a presentation is delivered to both in-person and remote audiences, each group receives equivalent access to the presented material and discussions. The instructor must balance engagement and information delivery across both audiences. This includes analyzing audio and video streams from the instructor, as well as inputs from all lecturing devices, such as microphones, to assess and enhance the overall effectiveness of the presentation.

At 701, the method 700 may include obtaining a live presentation video stream of a live presentation, a live presenter audio stream of the live presentation, and presentation material. The live presentation may be associated with the presentation material. As an example, referring back to FIG. 1, the collection module 108 may obtain the live presentation video stream from the camera 103 of the presenter 101, the audio stream from a microphone 105 of the presenter and presentation material 102.

At 703, the method 700 may include evaluating the live presentation using a prepared presentation evaluation MLM configured to generate a presentation score based on the live presentation video stream, the live presenter audio stream, and the presentation material. As an example, referring back to FIGS. 1-3, the prepared presentation evaluation MLM 112 may generate a presentation score based on the presentation video stream from the camera 103, the presenter audio stream from a microphone 105, and the presentation material 102.

In some aspects, the prepared presentation evaluation MLM may further be configured to generate a live presentation score based on individual engagement scores for in-person audience members and remote presentation score based on individual engagement scores for remote audience members. For example, the prepared presentation evaluation MLM is implemented to evaluate the effectiveness of a single presenter delivering a lecture to multiple audience types (e.g., in-person or remote) simultaneously. The prepared presentation evaluation MLM accounts for the presenter's ability to adapt their presentation techniques to address the differing sensory experiences, interaction modes, and technological affordances of each audience. For example, the presenter is expected to balance engagement between in-person person discussions and online chat interactions, recognizing that in-person audience members may observe real-time physical phenomena-such as chemical reactions involving smell or color changes-which remote audience members cannot directly perceive. Accordingly, the instructor should verbally convey these sensory details to ensure comprehension by the remote audience. Conversely, the remote audience may benefit from advanced digital tools, such as multi-screen setups or virtual reality interfaces, which may not be accessible to in-person attendees. Moreover, due to the lack of integrated microphones in physical discussions, simultaneous but distinct conversation threads may arise between the two groups. The instructor is therefore expected to harmonize and clarify key discussion points across both communication channels. The scoring system assesses the instructor's effectiveness in maintaining pedagogical coherence and inclusive engagement across these diverse modalities.

In some aspects, the prepared engagement evaluation MLM is configured to evaluate the individual engagement score for an audience member participating as an in-person audience member differently than an audience member participating as a remote audience member by assigning a first set of weights to the plurality of video streams, the plurality of audio streams, and the plurality of capture streams capturing each respective audience member participating as an in-person audience member and a second set of weights to the plurality of video streams, the plurality of audio streams, and the plurality of capture streams capturing each respective audience member participating as a remote audience member.

For example, the prepared engagement evaluation MLM is configured to compute individualized engagement scores by applying audience-specific evaluation criteria, depending on whether an audience member is participating as an in-person attendee or as a remote attendee. To achieve this, the MLM assigns a first set of weights to the plurality of video streams, audio streams, and additional capture streams (such as facial expression, gaze tracking, or body language inputs) associated with in-person audience members. These weights are optimized to reflect the sensory and interactive modalities typical of a physical presence, including direct eye contact, physical gestures, or proximity-based attention indicators. Conversely, a second, distinct set of weights is applied to the corresponding streams captured from remote audience members. These weights may prioritize different interaction signals, such as webcam-based facial cues, microphone activity, screen engagement metrics, or chat participation. This differential weighting allows the MLM to more accurately evaluate engagement within each context, accounting for the inherent differences in how engagement manifests across physical and virtual environments.

In some aspects, the method 700 may include: obtaining an audio stream of the in-person audience members, a pre-recorded presentation video stream of a pre-recorded presentation, a pre-recorded presenter audio stream of the pre-recorded presentation, the live presentation may be associated with the pre-recorded presentation; and evaluating the pre-recorded presentation using the prepared evaluation MLM to further generate the presentation score based on the audio stream of the in-person audience members, the live presentation video stream, the live presenter audio stream, the pre-recorded presentation video stream, the pre-recorded presenter audio stream, and the presentation material. For example, prepared evaluation MLM may further evaluate additional forms of user interaction associated with the consumption of presentation content. These interactions may include, but are not limited to, user inputs via keyboard, touchscreen, remote control, or other input devices utilized to manage video and audio streams. Examples of such interactions include pausing, fast-forwarding, rewinding, and resuming playback. Furthermore, the system may monitor user engagement with interactive features embedded within the presentation platform, such as participation in real-time or asynchronous discussions, submission of comments displayed below the video content, responses to embedded quizzes, and other forms of content-related interaction. These user inputs may be recorded and analyzed to assess engagement levels and overall user experience.

At 705, the method 700 may include obtaining, for each audience member participating in the live presentation as an in-person audience member or a remote audience member, a plurality of video streams capturing each respective audience member, a plurality of audio streams for each respective audience member, and a plurality of capture streams capturing an interaction of each audience member and a respective computing device. As an example, referring back to FIGS. 1 and 3, the collection module 108 may obtain, for each audience member 107_a_, 107_b_,107_n_ participating in the live presentation as an in-person audience member or a remote audience member, a plurality of video streams from cameras 109_a_, 109_b_, 109_n_ capturing each respective audience member 107_a_, 107_b_, 107_n_, a plurality of audio streams from microphones 113_a_, 113_b_, 113_n_ for each respective audience member 107_a_, 107_b_, 107_n_, and a plurality of capture streams from the computing devices 111_a_, 111_b_, 111_n_ capturing an interaction of each audience member 107_a_, 107_b_, 107_n_ and a respective computing device 111_a_, 111_b_, 111_n_.

At 707, the method 700 may include evaluating an engagement of at least one audience member using a prepared engagement evaluation MLM configured to generate an individual engagement score for the at least one audience member based on the plurality of video streams, the plurality of audio streams, and the plurality of capture streams. For example, each audience member will experience the presentation uniquely, as their comprehension and interaction with the instructor occur through different channels. These channels—whether visual, auditory, or interactive—vary based on whether the participant is attending remotely or in person, influencing how effectively information is received and processed. As an example, referring back to FIGS. 1-3, a prepared engagement evaluation MLM 114 may be configured to generate an individual engagement score for at least one audience member based on the plurality of video streams, the plurality of audio streams, and the plurality of capture streams.

In some aspects, the method 700 may include identifying a subject matter for the presentation and recognizing topics for the presentation using a topic MLM configured to determine main topics of the presentation based on the presentation material; evaluating the presentation of each topic of the presentation using the prepared presentation evaluation MLM configured to generate a respective presentation score for each topic based on the subject matter, recognized topic, presentation video stream, the presenter audio stream, and the presentation material; and evaluating the engagement of at least one audience member for each topic of the presentation using the prepared engagement evaluation MLM configured to generate a respective engagement score of the at least one audience member for each topic based on the subject matter, the recognized topic, the plurality of video streams, the plurality of audio streams, and the plurality of capture streams.

For example, the method 700 includes a multi-stage analysis framework that begins with identifying the subject matter of the presentation and recognizing specific topics within the presentation content. This is accomplished using a prepared topic MLM that is trained to analyze the presentation material and determine the primary topics being addressed. Once the topics are identified, each topic is individually evaluated by a prepared presentation evaluation MLM, which generates a respective presentation score for each topic. This evaluation is based on a combination of inputs, including the identified subject matter, recognized topics, the live presentation video stream, the presenter audio stream, and the associated presentation material. In parallel, the method evaluates audience engagement for each identified topic using a prepared engagement evaluation MLM. This model calculates a respective engagement score for at least one audience member per topic, using data such as the subject matter, recognized topics, and various audience interaction streams, including video, audio, and other capture streams (e.g., behavioral cues, attention indicators). Together, these processes enable granular assessment of both presentation quality and audience engagement at the topic level within a given session.

At 709, the method 700 may include generating, by a scoring engine, a comprehension score based at least in part on the presentation score and the individual engagement score for the at least one audience member. For example, the method 700 may include generating a comprehension score for at least one audience member using a scoring engine. This comprehension score is derived based at least in part on two primary inputs: the presentation score and the individual engagement score. The presentation score reflects the effectiveness and clarity with which a given topic or set of topics was delivered by the presenter, as evaluated by the prepared presentation evaluation MLM. The individual engagement score represents the degree of attentiveness and interactive participation exhibited by the specific audience member, as determined by the engagement evaluation MLM. By combining these metrics, the scoring engine produces a comprehension score intended to quantify the likelihood that the audience member has successfully understood and retained the presented material. This integrated evaluation supports a more holistic and individualized assessment of learning outcomes within hybrid or multimodal presentation environments. As an example, referring back to FIGS. 1 and 3-5, the scoring engine 120 may generate a comprehension score 519 based at least in part on the presentation score 508 and the real-time individual engagement score 511 for the at least one audience member.

In some aspects, the method 700 may include evaluating a group engagement of audience members for the presentation by generating, using the score engine, a group engagement score based on a plurality of engagement scores for each audience member participating as an in-person audience member or a remote audience member. For example, the method 700 may include evaluating the overall engagement of a group of audience members with respect to a given presentation by generating a group engagement score. This score is produced by a scoring engine and is calculated based on a plurality of individual engagement scores corresponding to each audience member, regardless of whether the audience member is participating as an in-person attendee or as a remote participant. The engagement scores may be derived from various behavioral and interaction data streams, including video, audio, and other sensor or input data, and reflect each individual's level of attention, interaction, and responsiveness during the presentation. The group engagement score serves as an aggregate metric that provides insight into the collective attentiveness and involvement of the entire audience, enabling further evaluation of presentation effectiveness, audience dynamics, or instructional quality across diverse attendance modalities. As an example, referring back to FIGS. 1 and 3-5, the scoring engine 120 may generate a group comprehension score based at least in part on the plurality of engagement scores 513 for each audience member participating as an in-person audience member or a remote audience member.

In some aspects, the method 700 may include evaluating a group engagement of audience members for each topic of the presentation using the prepared engagement evaluation MLM configured to generate a respective group engagement score of audience members for each topic based on the subject matter, the recognized topic, the plurality of video streams, the plurality of audio streams, and the plurality of capture streams. For example, this evaluation is performed using the prepared engagement evaluation MLM, which is configured to generate a respective group engagement score for the audience corresponding to each topic. The group engagement score is computed based on multiple data inputs, including the identified subject matter, the recognized topic, and a plurality of video streams, audio streams, and capture streams that reflect audience behavior and interaction. These capture streams may include, for example, facial expression analysis, gaze tracking, posture detection, and other engagement-related signals collected from both in-person and remote participants. By assessing audience engagement at the topic level, the system enables a fine-grained analysis of how different segments of the presentation resonate with the audience as a whole, supporting more precise evaluations of content effectiveness and delivery impact.

In some aspects, the method 700 may further include: based on the comprehension score, an output of the prepared presentation evaluation MLM, and an output of the prepared engagement evaluation MLM, generating, by a recommendation engine, a presenter recommendation to engage in-person audience members, a presenter recommendation to engage remote audience members, an in-person audience member recommendation, or a remote audience member recommendation; and displaying, on a display, at least one of the presenter recommendation to engage in-person audience members, the presenter recommendation to engage remote audience members, the in-person audience member recommendation, the remote audience member recommendation, the comprehension score, the presentation score, or the individual engagement score for the at least one audience member. For example, the recommendation engine may analyze the various scores and model outputs to determine actionable guidance for improving comprehension and engagement in real-time or for future sessions. Additionally, at least one of the presenter recommendations, audience member recommendations, the comprehension score, the presentation score, or the individual engagement score for a given audience member may be displayed on a display device. This enables presenters, audience members, or system administrators to access meaningful feedback and make informed adjustments to presentation strategies or interaction methods.

In some aspects, the presenter recommendation to engage in-person audience members may include at least one of: ask a question, introduce a poll or quiz, call on an audience member, identifying an audience member via audio stream, acknowledge contribution of an audience member, slow down, speed up, repeat material, summarize material, present a visual aid, or introduce a break. The presenter recommendation to engage remote audience members may include at least one of: ask a question, introduce a poll or quiz, call on an audience member, acknowledge contribution of remote audience member, slow down, speed up, repeat material, summarize material, present a visual aid, check framing, monitor audio, avoid filter words, rephrase for clarity, emphasize key points, stay on time, or introduce an audio stream capturing audio from the in-person audience members. The in-person audience member recommendation may include at least one of: take notes, ask questions, respond to prompts, use non-verbal feedback, participate in chat, adjust computing environment, or change physical posture. The remote audience member recommendation may include at least one of: take notes, ask questions, respond to prompts, use non-verbal feedback, participate in chat, adjust computing environment, change physical posture, pause lecture, or re-watch portion of lecture. These recommendations are designed to optimize engagement and comprehension across diverse presentation formats and audience modalities. In some aspects, the described presenter and audience member recommendations can be further used to calculate engagement scores by quantifying the occurrence and variety of these recommended actions. By tracking which and how many of these behaviors are exhibited during a session-both by the presenter (e.g., asking questions, introducing polls) and by in-person or remote audience members (e.g., asking questions, using non-verbal feedback, or re-watching content)—a weighted engagement score can be generated to reflect the overall interactivity and responsiveness of the learning environment.

In some aspects, the method 700 may include generating, by a recommendation engine, and displaying, on a display, a post-presentation presenter recommendation or a post-presentation audience member recommendation based on outputs of the prepared presentation MLM and the prepared engagement evaluation MLM. For example, the post-presentation presenter recommendation may provide guidance for improving delivery techniques, content clarity, or audience interaction strategies in subsequent sessions. Similarly, the post-presentation audience member recommendation may offer personalized feedback to individual participants to enhance comprehension or participation in future presentations. The system may display one or more of these recommendations on a display device accessible to the relevant users, thereby facilitating actionable insights derived from the evaluation of both presentation quality and audience engagement metrics.

In some aspects, the method 700 may include preparing the presentation evaluation MLM by: (1) providing, to the presentation evaluation MLM, a presentation training dataset comprising at least one of: (a) presenter video streams of individuals giving a presentation labeled and annotated with quality scores for clarity, engagement, accuracy, or content delivery to evaluate at least one of body language, gestures, facial expressions, or visual aids of the presenter, (b) corresponding audio streams labeled and annotated for features of at least one of voice quality, pauses, tone, or fluency to analyze speech delivery, clarity, tone, or impact of the presenter, (c) presentation material aligned with the labeled presenter video streams labeled and annotated to assess at least one of content quality, relevance, or alignment between the presentation and the presentation materials, and (d) ground truth labels for the presenter video streams, the corresponding audio streams, or the presentation material to serve as a target output for the presentation evaluation MLM model; and (2) preparing the presentation evaluation MLM using the presentation training dataset. For example, once the presentation training dataset is assembled and labeled, the method 700 continues with training the presentation evaluation MLM using this dataset. The model is optimized to learn correlations between the input modalities—video, audio, and content—and the annotated quality metrics. As a result, the trained model can later be deployed to automatically evaluate new presentation sessions by generating presentation scores that reflect the presenter's effectiveness across multiple dimensions. This process ensures that the presentation evaluation MLM is equipped with the contextual understanding and pattern recognition capabilities needed to provide accurate and consistent presentation evaluations.

In some aspects, the method 700 may include: preparing the engagement evaluation MLM by: (1) providing, to the engagement evaluation MLM, an engagement training dataset comprising at least one of: (a) individual video streams of audience members of a presentation labeled and annotated with facial expressions, gaze direction, body posture, or head movement to capture visual engagement cues, (b) corresponding audio streams labeled and annotated with speech activity, tone analysis, interruptions and pauses, or emotion detection to analyze participation through voice contribution and tone of speech, (c) capture streams of the audience members comprising at least one of keyboard input, mouse movements, or screen interactions, the capture streams may be labeled and annotated with active engagement, passive behavior, or multitasking to measure interaction of the audience members with a respective computing device, (d) an event list comprises at least one of interaction events, participation events, attention-related events, engagement-related events, time-based events, or behavioral and biometric events annotated with engagement levels, activity frequency, or contribution quality to capture session-specific events that indicate audience member engagement, and (e) ground truth labels for the individual video streams, the corresponding audio streams, the capture streams, or the event list to serve as a target output for the engagement evaluation MLM; and (2) preparing the engagement evaluation MLM using the provided engagement training dataset. For example, following the compilation of the engagement training dataset, the method 700 includes the step of training the engagement evaluation MLM using the labeled data. Through this process, the engagement evaluation MLM learns to associate specific multimodal signals with varying levels of engagement, thereby enabling it to automatically analyze new data and produce accurate engagement scores for individual audience members in live or recorded sessions. This model can later be deployed as part of an intelligent system to monitor, evaluate, and respond to engagement patterns in real-time or post-session analyses, enhancing both teaching effectiveness and audience outcomes.

In some aspects, the method 700 may include: preparing the topic MLM by: (1) providing, to the topic MLM, a topic training dataset comprising at least one of: (a) presentation materials labeled and annotated with subject matter, key topics, or keywords and phrases to extract and analyze a textual and visual content of the presentation to infer the subject matter and individual topics, (b) topic labeled datasets comprising at least domain-specific data labeled and annotated with subject matter tags and topics to train the topic MLM to recognize subject matter and topics, (c) audio and video presentation data comprising at least presentation recordings and corresponding audio streams labeled and annotated with subject matter and topics to identify spoken words, tone, and context for recognizing topics, and (d) ground truth labels for the presentation materials, topic labeled datasets, or audio and video presentation data to serve as a target output for the topic MLM; and (2) preparing the topic MLM using the provided topic training dataset. For example, once the topic training dataset is assembled and annotated, the method 700 continues by training the topic MLM using this dataset. Through this process, the topic MLM learns to identify and segment content into meaningful topics based on textual, visual, and auditory inputs. Upon completion of training, the topic MLM can be deployed to analyze live or recorded presentations, automatically identifying key topics and associating them with subject matter classifications. This enables more granular evaluation of presentation content, facilitates topic-specific engagement and comprehension scoring, and supports enhanced indexing, retrieval, and summarization of educational or informational sessions.

It is understood that the method illustrated by FIG. 7 is exemplary in nature and that the steps described herein may be combined or modified to generate alternative embodiments.

Figure 8:
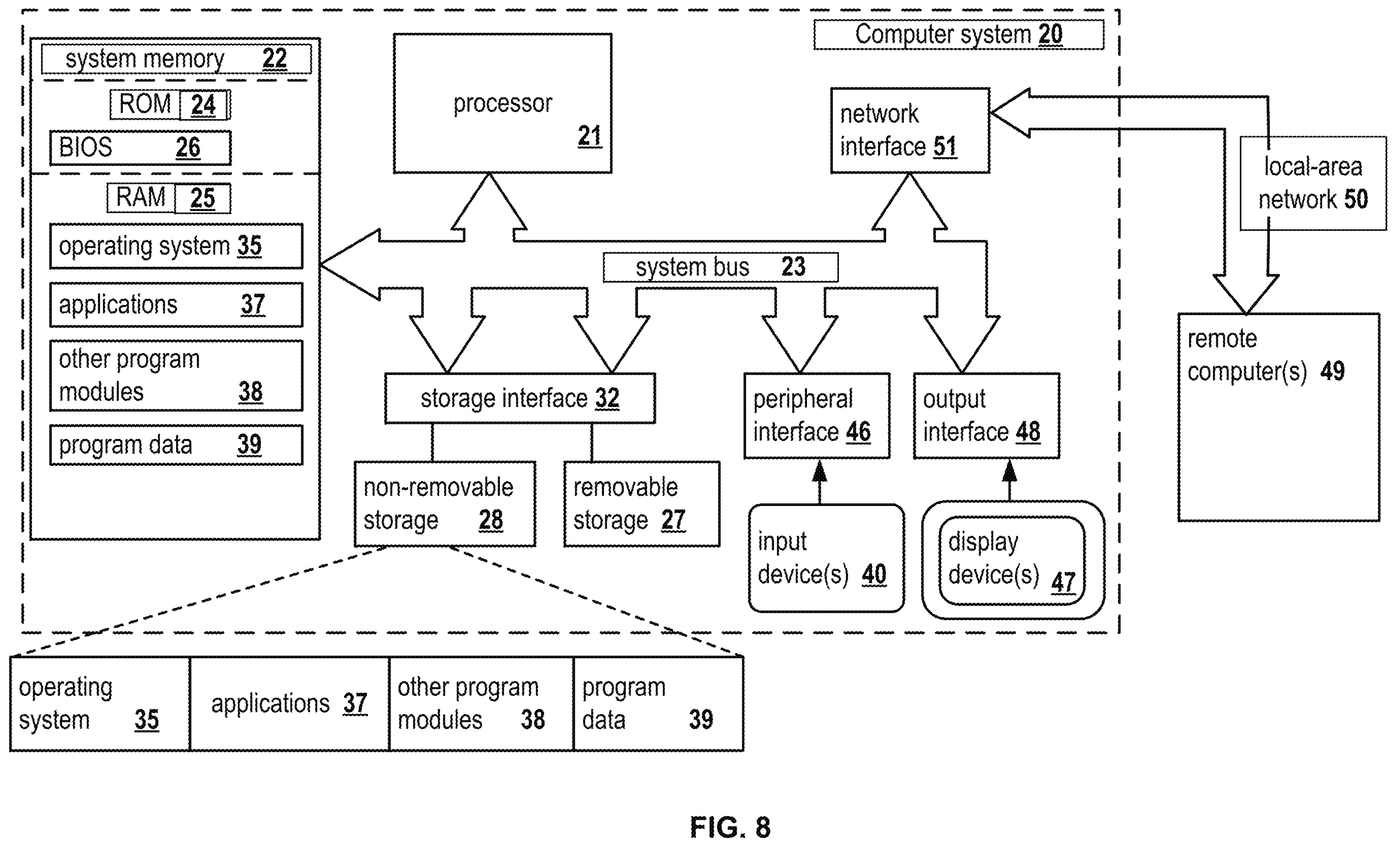
FIG. 8 presents an example of a general-purpose computer system on which aspects of the present disclosure can be implemented.

FIG. 8 presents an example of a general-purpose computer system on which aspects of the present disclosure can be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-8 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for machine learning (ML)-based assessment of a live presentation by a presenter and engagement of in-person and remote audience members, comprising:

obtaining a live presentation video stream of a live presentation, a live presenter audio stream of the live presentation, and presentation material, wherein the live presentation is associated with the presentation material;

evaluating the live presentation using a prepared presentation evaluation machine learning model (MLM) configured to generate a presentation score based on the live presentation video stream, the live presenter audio stream, and the presentation material;

obtaining, for each audience member participating in the live presentation as an in-person audience member or a remote audience member, a plurality of video streams capturing each respective audience member, a plurality of audio streams for each respective audience member, and a plurality of capture streams capturing an interaction of each audience member and a respective computing device;

evaluating an engagement of at least one audience member using a prepared engagement evaluation MLM configured to generate an individual engagement score for the at least one audience member based on the plurality of video streams, the plurality of audio streams, and the plurality of capture streams; and generating, by a scoring engine, a comprehension score based at least in part on the presentation score and the individual engagement score for the at least one audience member.

2. The method of claim 1, wherein the prepared presentation evaluation MLM is further configured to generate a live presentation score based on individual engagement scores for in-person audience members and remote presentation score based on individual engagement scores for remote audience members.

3. The method of claim 1, wherein the prepared engagement evaluation MLM is configured to evaluate the individual engagement score for an audience member participating as an in-person audience member differently than an audience member participating as a remote audience member by assigning a first set of weights to the plurality of video streams, the plurality of audio streams, and the plurality of capture streams capturing each respective audience member participating as an in-person audience member and a second set of weights to the plurality of video streams, the plurality of audio streams, and the plurality of capture streams capturing each respective audience member participating as a remote audience member.

4. The method of claim 1, further comprising:

based on the comprehension score, an output of the prepared presentation evaluation MLM, and an output of the prepared engagement evaluation MLM, generating, by a recommendation engine, a presenter recommendation to engage in-person audience members, a presenter recommendation to engage remote audience members, an in-person audience member recommendation, or a remote audience member recommendation; and displaying, on a display, at least one of the presenter recommendation to engage in-person audience members, the presenter recommendation to engage remote audience members, the in-person audience member recommendation, the remote audience member recommendation, the comprehension score, the presentation score, or the individual engagement score for the at least one audience member.

5. The method of claim 4, wherein the presenter recommendation to engage in-person audience members comprises at least one of: ask a question, introduce a poll or quiz, call on an audience member, identifying an audience member via audio stream, acknowledge contribution of an audience member, slow down, speed up, repeat material, summarize material, present a visual aid, or introduce a break, wherein the presenter recommendation to engage remote audience members comprises at least one of: ask a question, introduce a poll or quiz, call on an audience member, acknowledge contribution of remote audience member, slow down, speed up, repeat material, summarize material, present a visual aid, check framing, monitor audio, avoid filter words, rephrase for clarity, emphasize key points, stay on time, or introduce an audio stream capturing audio from the in-person audience members, wherein the in-person audience member recommendation comprises at least one of: take notes, ask questions, respond to prompts, use non-verbal feedback, participate in chat, adjust computing environment, or change physical posture, and wherein the remote audience member recommendation comprises at least one of: take notes, ask questions, respond to prompts, use non-verbal feedback, participate in chat, adjust computing environment, change physical posture, pause lecture, or re-watch portion of lecture.

6. The method of claim 1, further comprising:

identifying a subject matter for the presentation and recognizing topics for the presentation using a topic MLM configured to determine main topics of the presentation based on the presentation material;

evaluating the presentation of each topic of the presentation using the prepared presentation evaluation MLM configured to generate a respective presentation score for each topic based on the subject matter, recognized topic, presentation video stream, the presenter audio stream, and the presentation material; and evaluating the engagement of at least one audience member for each topic of the presentation using the prepared engagement evaluation MLM configured to generate a respective engagement score of the at least one audience member for each topic based on the subject matter, the recognized topic, the plurality of video streams, the plurality of audio streams, and the plurality of capture streams.

7. The method of claim 1, further comprising:

evaluating a group engagement of audience members for the presentation by generating, using the score engine, a group engagement score based on a plurality of engagement scores for each audience member participating as an in-person audience member or a remote audience member.

8. The method of claim 6, further comprising:

evaluating a group engagement of audience members for each topic of the presentation using the prepared engagement evaluation MLM configured to generate a respective group engagement score of audience members for each topic based on the subject matter, the recognized topic, the plurality of video streams, the plurality of audio streams, and the plurality of capture streams.

9. The method of claim 1, further comprising:

obtaining an audio stream of the in-person audience members, a pre-recorded presentation video stream of a pre-recorded presentation, a pre-recorded presenter audio stream of the pre-recorded presentation, wherein the live presentation is associated with the pre-recorded presentation; and evaluating the pre-recorded presentation using the prepared evaluation MLM to further generate the presentation score based on the audio stream of the in-person audience members, the live presentation video stream, the live presenter audio stream, the pre-recorded presentation video stream, the pre-recorded presenter audio stream, and the presentation material.

10. The method of claim 1, further comprising preparing the presentation evaluation MLM by:

(1) providing, to the presentation evaluation MLM, a presentation training dataset comprising at least one of:
  (a) presenter video streams of individuals giving a presentation labeled and annotated with quality scores for clarity, engagement, accuracy, or content delivery to evaluate at least one of body language, gestures, facial expressions, or visual aids of the presenter,
  (b) corresponding audio streams labeled and annotated for features of at least one of voice quality, pauses, tone, or fluency to analyze speech delivery, clarity, tone, or impact of the presenter,
  (c) presentation material aligned with the labeled presenter video streams labeled and annotated to assess at least one of content quality, relevance, or alignment between the presentation and the presentation materials, and
  (d) ground truth labels for the presenter video streams, the corresponding audio streams, or the presentation material to serve as a target output for the presentation evaluation MLM model; and
(2) preparing the presentation evaluation MLM using the presentation training dataset.

11. The method of claim 1, further comprising preparing the engagement evaluation MLM by:

(1) providing, to the engagement evaluation MLM, an engagement training dataset comprising at least one of:
  (a) individual video streams of audience members of a presentation labeled and annotated with facial expressions, gaze direction, body posture, or head movement to capture visual engagement cues,
  (b) corresponding audio streams labeled and annotated with speech activity, tone analysis, interruptions and pauses, or emotion detection to analyze participation through voice contribution and tone of speech,
  (c) capture streams of the audience members comprising at least one of keyboard input, mouse movements, or screen interactions, wherein the capture streams are labeled and annotated with active engagement, passive behavior, or multitasking to measure interaction of the audience members with a respective computing device, (d) an event list comprises at least one of interaction events, participation events, attention-related events, engagement-related events, time-based events, or behavioral and biometric events annotated with engagement levels, activity frequency, or contribution quality to capture session-specific events that indicate audience member engagement, and (e) ground truth labels for the individual video streams, the corresponding audio streams, the capture streams, or the event list to serve as a target output for the engagement evaluation MLM; and (2) preparing the engagement evaluation MLM using the provided engagement training dataset.

12. The method of claim 6, further comprising preparing the topic MLM by:

(1) providing, to the topic MLM, a topic training dataset comprising at least one of:

(a) presentation materials labeled and annotated with subject matter, key topics, or keywords and phrases to extract and analyze a textual and visual content of the presentation to infer the subject matter and individual topics, (b) topic labeled datasets comprising at least domain-specific data labeled and annotated with subject matter tags and topics to train the topic MLM to recognize subject matter and topics, (c) audio and video presentation data comprising at least presentation recordings and corresponding audio streams labeled and annotated with subject matter and topics to identify spoken words, tone, and context for recognizing topics, and (d) ground truth labels for the presentation materials, topic labeled datasets, or audio and video presentation data to serve as a target output for the topic MLM; and (2) preparing the topic MLM using the provided topic training dataset.

13. The method of claim 1, further comprising:

generating, by a recommendation engine, and displaying, on a display, a post-presentation presenter recommendation or a post-presentation audience member recommendation based on outputs of the prepared presentation MLM and the prepared engagement evaluation MLM.

14. A system for machine learning (ML)-based assessment of a live presentation by a presenter and engagement of in-person and remote audience members, comprising:

at least one memory; and at least one hardware processor coupled with the at least one memory and configured, individually or in combination, to:

obtain a live presentation video stream of a live presentation, a live presenter audio stream of the live presentation, and presentation material, wherein the live presentation is associated with the presentation material;

evaluate the live presentation using a prepared presentation evaluation machine learning model (MLM) configured to generate a presentation score based on the live presentation video stream, the live presenter audio stream, and the presentation material;

obtain, for each audience member participating in the live presentation as an in-person audience member or a remote audience member, a plurality of video streams capturing each respective audience member, a plurality of audio streams for each respective audience member, and a plurality of capture streams capturing an interaction of each audience member and a respective computing device;

evaluate an engagement of at least one audience member using a prepared engagement evaluation MLM configured to generate an individual engagement score for the at least one audience member based on the plurality of video streams, the plurality of audio streams, and the plurality of capture streams; and generate, by a scoring engine, a comprehension score based at least in part on the presentation score and the individual engagement score for the at least one audience member.

15. The system of claim 14, wherein the prepared presentation evaluation MLM is further configured to generate a live presentation score based on individual engagement scores for in-person audience members and remote presentation score based on individual engagement scores for remote audience members.

16. The system of claim 14, wherein the prepared engagement evaluation MLM is configured to evaluate the individual engagement score for an audience member participating as an in-person audience member differently than an audience member participating as a remote audience member by assigning a first set of weights to the plurality of video streams, the plurality of audio streams, and the plurality of capture streams capturing each respective audience member participating as an in-person audience member and a second set of weights to the plurality of video streams, the plurality of audio streams, and the plurality of capture streams capturing each respective audience member participating as a remote audience member.

17. The system of claim 14, wherein the at least one hardware processor coupled with the at least one memory and configured, individually or in combination, to:

based on the comprehension score, an output of the prepared presentation evaluation MLM, and an output of the prepared engagement evaluation MLM, generate, by a recommendation engine, a presenter recommendation to engage in-person audience members, a presenter recommendation to engage remote audience members, an in-person audience member recommendation, or a remote audience member recommendation; and cause for display, on a display, at least one of the presenter recommendations to engage in-person audience members, the presenter recommendation to engage remote audience members, the in-person audience member recommendation, the remote audience member recommendation, the comprehension score, the presentation score, or the individual engagement score for the at least one audience member.

18. The system of claim 17, wherein the presenter recommendation to engage in-person audience members comprises at least one of: ask a question, introduce a poll or quiz, call on an audience member, identifying an audience member via audio stream, acknowledge contribution of an audience member, slow down, speed up, repeat material, summarize material, present a visual aid, or introduce a break, wherein the presenter recommendation to engage remote audience members comprises at least one of: ask a question, introduce a poll or quiz, call on an audience member, acknowledge contribution of remote audience member, slow down, speed up, repeat material, summarize material, present a visual aid, check framing, monitor audio, avoid filter words, rephrase for clarity, emphasize key points, stay on time, or introduce an audio stream capturing audio from the in-person audience members, wherein the in-person audience member recommendation comprises at least one of: take notes, ask questions, respond to prompts, use non-verbal feedback, participate in chat, adjust computing environment, or change physical posture, and wherein the remote audience member recommendation comprises at least one of: take notes, ask questions, respond to prompts, use non-verbal feedback, participate in chat, adjust computing environment, change physical posture, pause lecture, or re-watch portion of lecture.

19. The system of claim 14, wherein the at least one hardware processor coupled with the at least one memory and configured, individually or in combination, to:

(1) provide, to the presentation evaluation MLM, a presentation training dataset comprising at least one of:

(a) presenter video streams of presenters presenting a presentation labeled and annotated with quality scores for clarity, engagement, accuracy, or content delivery to evaluate at least one of body language, gestures, facial expressions, or visual aids of the presenter, (b) corresponding audio streams labeled and annotated for features of at least one of voice quality, pauses, tone, or fluency to analyze speech delivery, clarity, tone, or impact of the presenter, (c) presentation material aligned with the labeled presenter video streams labeled and annotated to assess at least one of content quality, relevance, or alignment between the presentation and the presentation materials, and (d) ground truth labels for the presenter video streams, the corresponding audio streams, or the presentation material to serve as a target output for the presentation evaluation MLM model; and (2) prepare the presentation evaluation MLM using the presentation training dataset.

20. A non-transitory computer readable medium storing thereon computer executable instructions for machine learning (ML)-based assessment of a live presentation by a presenter and engagement of in-person and remote audience members, including instructions for:

obtaining a live presentation video stream of a live presentation, a live presenter audio stream of the live presentation, and presentation material, wherein the live presentation is associated with the presentation material;

evaluating the live presentation using a prepared presentation evaluation machine learning model (MLM) configured to generate a presentation score based on the live presentation video stream, the live presenter audio stream, and the presentation material;

obtaining, for each audience member participating in the live presentation as an in-person audience member or a remote audience member, a plurality of video streams capturing each respective audience member, a plurality of audio streams for each respective audience member, and a plurality of capture streams capturing an interaction of each audience member and a respective computing device;

evaluating an engagement of at least one audience member using a prepared engagement evaluation MLM configured to generate an individual engagement score for the at least one audience member based on the plurality of video streams, the plurality of audio streams, and the plurality of capture streams; and generating, by a scoring engine, a comprehension score based at least in part on the presentation score and the individual engagement score for the at least one audience member.

* * * * *